(12) United States Patent
Thomson et al.

(10) Patent No.: US 7,184,495 B2
(45) Date of Patent: Feb. 27, 2007

(54) EFFICIENT PILOT TRACKING METHOD FOR OFDM RECEIVERS

(75) Inventors: John Thomson, Santa Clara, CA (US); Teresa Meng, Portola Valley, CA (US)

(73) Assignee: Atheros Communications, Inc., Santa Clara, CA (US)

(*) Notice: Subject to any disclaimer, the term of this patent is extended or adjusted under 35 U.S.C. 154(b) by 778 days.

(21) Appl. No.: 10/076,022

(22) Filed: Feb. 14, 2002

(65) Prior Publication Data

US 2003/0058951 A1 Mar. 27, 2003

Related U.S. Application Data

(63) Continuation of application No. 09/962,928, filed on Sep. 24, 2001, now Pat. No. 7,103,116.

(60) Provisional application No. 60/331,361, filed on Sep. 24, 2001.

(51) Int. Cl.
*H04L 27/06* (2006.01)

(52) U.S. Cl. ....................................... 375/340

(58) Field of Classification Search ................ 375/260, 375/285, 324, 326, 340–343, 362, 365; 370/500, 370/509, 512, 514
See application file for complete search history.

(56) References Cited

U.S. PATENT DOCUMENTS

| | | | |
|---|---|---|---|
| 5,583,886 A | 12/1996 | Rohani et al. ............... 375/227 |
| 5,745,535 A | 4/1998 | Mori | |
| 5,770,971 A | 6/1998 | McNicol ...................... 330/52 |
| 5,799,047 A | 8/1998 | Dobrica ....................... 375/350 |
| 5,818,872 A * | 10/1998 | Gupta ......................... 375/222 |
| 6,151,313 A | 11/2000 | Abramson | |
| 6,310,925 B1 | 10/2001 | Kitta | |
| 6,359,938 B1 * | 3/2002 | Keevill et al. ............... 375/316 |
| 6,549,561 B2 * | 4/2003 | Crawford ..................... 375/137 |
| 6,549,583 B2 * | 4/2003 | Crawford ..................... 375/260 |
| 6,625,231 B1 | 9/2003 | Shen | |
| 6,628,738 B1 * | 9/2003 | Peeters et al. ............... 375/371 |
| 6,633,616 B2 * | 10/2003 | Crawford ..................... 375/326 |
| 6,643,339 B1 | 11/2003 | Okanoue et al. | |
| 6,680,932 B1 | 1/2004 | Hsuan et al. | |
| 6,711,221 B1 | 3/2004 | Belotserkovsky et al. | |
| 6,728,301 B1 | 4/2004 | Chrisikos | |
| 6,738,375 B1 | 5/2004 | Okanoue | |
| 6,928,120 B1 | 8/2005 | Zhang | |
| 6,940,932 B2 | 9/2005 | Henriksson | |
| 6,940,933 B1 | 9/2005 | Heinonen et al. | |
| 6,944,122 B2 | 9/2005 | Shirakata et al. | |
| 6,963,619 B1 | 11/2005 | Gesbert et al. | |
| 2002/0065047 A1 * | 5/2002 | Moose ......................... 455/63 |

OTHER PUBLICATIONS

Stensby, John L. *Phase-Locked Loops: Theory and Applications*. CRC Press LLC, 1997, pp. 229-233.

* cited by examiner

*Primary Examiner*—Khanh Tran
(74) *Attorney, Agent, or Firm*—Bever, Hoffman & Harms, LLP; Jeanette S. Harms

(57) ABSTRACT

A method for maintaining an accurate channel estimate. The method includes providing a reference channel estimate based on at least one long training symbol, and generating a frequency domain representation of a first data symbol including a plurality of pilots. The method then includes tracking phase change in the plurality of pilots of the first data symbol relative to pilots of the at least one long training symbol to produce correction factors, and adjusting the reference channel estimate based upon the correction factors.

39 Claims, 9 Drawing Sheets

EFFICIENT PILOT TRACKING METHOD FOR OFDM RECEIVERS

CROSS REFERENCE TO RELATED APPLICATIONS

The present application is a continuation of U.S. application Ser. No. 09/962,928, filed Sep. 24, 2001 now U.S. Pat. No. 7,103,116, entitled "Detection of a False Detection of a Communication Packet," hereby incorporated by reference herein, and claims priority to this U.S. application Ser. No. 09/962,928 and to U.S. application Ser. No. 09/963,096, filed Sep. 24, 2001, entitled "An Efficient Pilot Tracking Method For OFDM Receivers," which was converted to U.S. Provisional Application Ser. No. 60/331,361, on Feb. 8, 2002.

FIELD

The present invention pertains generally to pilot tracking. More particularly, the present invention relates to tracking pilot signals in order maintain an accurate channel estimate despite the presence of magnitude changes, phase noise, frequency offset between a receiver and transmitter, and timing drift.

BACKGROUND

The market for home networking is developing at a phenomenal rate. Service providers from cable television, telephony and digital subscriber line markets are vying to deliver bundled services such as basic telephone service, Internet access and entertainment directly to the consumer. Collectively these services require a high-bandwidth network that can deliver 30 Mbits/s or even high rates. The Institute of Electrical and Electronic Engineers (IEEE) 802.11a standard describes a cost-effective, robust, high-performance local-area network (LAN) technology for distributing this multimedia information within the home. Networks that will operate in accordance with standard 802.11a will use the 5-GHz UNII (unlicensed National Information Infrastructure) band and may achieve data rates as high as 54 Mbits/s, a significant improvement over other standards-based wireless technology. The 802.11a standard has some unique and distinct advantages over other wireless standards in that it uses orthogonal frequency-division multiplexing (OFDM) as opposed to spread spectrum, and it operates in the clean band of frequencies at 5 GHz.

OFDM is a technology that resolves many of the problems associated with the indoor wireless environment. Indoor environments such as homes and offices are difficult because the radio system has to deal with a phenomenon called "multipath." Multipath is the effect of multiple received radio signals coming from reflections off walls, ceilings, floors, furniture, people and other objects. In addition, the radio has to deal with another frequency phenomenon called "fading," where blockage of the signal occurs due to objects or the position of a communications device (e.g., telephone, TV) relative to the transceiver that gives the device access to the cables or wires of the cable TV, telephone or internet provider.

OFDM has been designed to deal with these phenomena and at the same time utilize spectrum more efficiently than spread spectrum to significantly increase performance. Ratified in 1999, the IEEE 802.11a standard significantly increases the performance (54 Mbits/s vs. 11 Mbits/s) of indoor wireless networks.

The ability of OFDM to deal with multipath and fading is due to the nature of OFDM modulation. OFDM modulation is essentially the simultaneous transmission of a large number of narrow band carriers sometimes called subcarriers, each modulated with a low data rate, but the sum total yielding a very high data rate. FIG. 1a illustrates the frequency spectrum of multiple modulated subcarriers in an OFDM system. To obtain high spectral efficiency the frequency response of the subcarriers are overlapping and orthogonal, hence the name OFDM. Each narrowband subcarrier can be modulated using various modulation formats such as binary phase shift keying (BPSK), quaternary phase shift keying (QPSK) and quadrature amplitude modulation QAM (or the differential equivalents). The 802.11a standard specifies that each 20 MHz channel has 52 subcarriers covering 16.5 MHz of the 20 MHz, leaving 3.5 MHz to be used for preventing interference between channels.

Since the modulation rate on each subcarrier is very low, each subcarrier experiences flat fading in multipath environments and is relatively simple to equalize, where coherent modulation is used. The spectrums of the modulated subcarriers in an OFDM system are not separated but overlap. The reason why the information transmitted over the carriers can still be separated is the so-called orthogonality relation giving the method its name. The orthogonality relation of the subcarriers requires the subcarriers to be spaced in such a way that at the frequency where the received signal is evaluated all other signals are zero. In order for this orthogonality to be preserved it helps for the following to be true:

1. Synchronization of the receiver and transmitter. This means they should assume the same modulation frequency and the same time-scale for transmission (which usually is not the case).
2. The analog components, part of transmitter and receiver, are of high quality.
3. The multipath channel needs to be accounted for by placing guard intervals which do not carry information between data symbols. This means that some parts of the signal cannot be used to transmit information.

If the receiver and transmitter are not synchronized the orthogonality of the subcarriers is compromised and data imposed on a subcarrier may be not be recovered accurately due to inter-carrier interference. FIG. 1b illustrates the effect of the lack of synchronization on the frequency spectrum of multiple subcarriers. The dashed lines show where the spectrum for the subcarrier should be, and the solid lines shows where the spectrum falls due to the lack of synchronization. Since the receiver and transmitter need to be synchronized for reliable OFDM communication to occur, but in fact in practice they do not, it is necessary to compensate for the offset between the receiver and the transmitter. The offset can occur due to the inherent inaccuracy of the synthesizers in the transmitter and receiver and to drift due to temperature or other reasons. The offset can be compensated for at the receiver, but present methods only produce a coarse estimate of the actual offset. According to one method for compensating for the offset, the analog signal received by a receiver is divided into three sections: short symbol section, long symbol section and data symbol section. Some of the short symbols in the short symbol section are used for automatic gain control and for detecting symbol timing. Other short symbols are sampled and digitized and auto-correlated to produce a coarse estimate of the offset. The coarse estimate of the offset is then used to produce a digital periodic signal whose frequency is based on the coarse estimate of the offset.

The digital periodic signal is multiplied with digital samples of the long symbols, when they arrive, and the product is fast fourier transformed to produce a frequency domain representation of the long symbols as modified by the channel between the transmitter and the receiver (frequency domain representation of received long symbols). The long symbols are a predetermined sequence that is set by the standard to have a predetermined length and information content with a predetermined phase and amplitude. Since the longs are a predetermined sequence, the receiver is designed to store a fourier transform of the long symbols substantially equivalent to the fourier transform of the long symbols as transmitted by the transmitter (frequency domain representation of the transmitted long symbols). The quotient of the frequency domain representation of the received long symbols and the frequency domian representation of the transmitted long symbols is the channel estimate or channel transfer function. The channel estimate shows how the channel affects the amplitude and phase of the samples of the long symbols. The inverse of the channel estimate gives an indication of how the samples of a received data signal need to be adjusted in order to compensate for the effect of the channel.

The digital periodic signal is also used to multiply digital samples of the data symbols (digital data samples) when they arrive, thereby correcting for the offset. The data can be recovered from the product of the digital carrier and the digital data samples using the inverse of the channel estimate.

Unfortunately, the inverse of the channel estimate may become invalid with the passage of time due to magnitude changes, frequency offset error, timing drift, and phase noise, and inappropriate to use for decoding data symbols. For example, the pilots of the long symbols on which the inverse channel estimate is based may have an average power magnitude that is different from the average power magnitude of the pilots of a data symbol. Since the 802.11a standard allows transmission using quadrature amplitude modulation, proper decoding of data symbols depends on accurate determination of the amplitude of the subcarriers in a data symbol. Using an inverse channel estimate to decode a data symbol that has pilots whose average power magnitude is different from the average power magnitude of the pilots of the long symbol on which the inverse channel estimate is based may result in improper decoding of the data symbol.

Furthermore, since the short symbols from which the frequency offset was derived are relatively short, the estimate of the offset may be off appreciably from the actual offset. Consequently, there will be a residual offset which may cause the spectrum of one subcarrier to overlap with the spectrum of another subcarrier. Due to the overlap, when data is recovered for one subcarrier, the data may include interference from an adjacent subcarrier, degrading the throughput of the communication system. Furthermore, since there is a residual offset the channel estimate that was producing using the long symbols is not an accurate representation of the actual transfer function due to the channel. Due to the inaccuracy, errors in data recovery are possible.

Another source of error is timing drift which causes a data symbol to be sampled earlier or later than specified. Early sampling of a data symbol such that samples of the guard symbol are included in creating a frequency domain representation of the data symbol causes the phases of the subcarriers of the data symbol to rotate by an amount that is proportional to the number of guard samples that sampling is early. If the number of guard samples that sampling is early is known and does not change over time, the effect of the phase rotation can be compensated for. Unfortunately, the number of guard samples that sampling is early drifts over time and needs to be determined in order to compensate for the phase rotation. Another problem with timing drift is intersymbol interference. Sampling for a certain symbol may start early or late causing samples from a previous symbol or a later symbol, respectively, to be used in decoding the certain symbol. This problem is especially evident in multipath environments where much of the guard interval has already been consumed.

Another source of error is phase noise which affects all subcarrier phases by an equal amount, assuming that the frequency of the phase noise is much less than the symbol frequency. Since the effect of phase noise on the channel estimate is different from the effect on a data symbol, using the channel estimate to decode a data symbol may be inappropriate.

As described above, existing solutions are not capable of providing a channel estimate that compensates for the factors of frequency offset, timing drift, and phase noise. Consequently, it is desirable to provide a solution that overcomes the shortcomings of existing solutions.

SUMMARY

A method for maintaining an accurate channel estimate is described. The method includes providing a reference channel estimate based on at least one long training symbol, and generating a frequency domain representation of a first data symbol including a plurality of pilots. The method then includes tracking phase change in the plurality of pilots of the first data symbol relative to pilots of the at least one long training symbol to produce correction factors, and adjusting the reference channel estimate based upon the correction factors.

BRIEF DESCRIPTION OF THE DRAWINGS

The present invention is illustrated by way of example, and not limitation, in the figures of the accompanying drawings in which like references denote similar elements, and in which.

DETAILED DESCRIPTION

Methods and apparatus for maintaining an accurate channel estimate in the presence of errors due to magnitude changes in the received signal, frequency offset between receiver and transmitter, timing drift, and phase noise, tracking phase and magnitude of pilot signals, adjusting symbol timing, and determining residual frequency offset are described. In the following description, for purposes of explanation, numerous specific details are set forth in order to provide a thorough understanding of the present invention. It will be evident, however, to one skilled in the art that the present invention may be practiced in a variety of radio frequency circuits, especially an orthogonal frequency division multiplexing circuit, without these specific details. In other instances, well-known operations, steps, functions and elements are not shown in order to avoid obscuring the invention.

Parts of the description will be presented using terminology commonly employed by those skilled in the art to convey the substance of their work to others skilled in the art, such as orthogonal frequency division multiplexing, fast fourier transform (FFT), angle-vector and vector-angle conversions, pilots, subcarrier, and so forth. Various operations will be described as multiple discrete steps performed in turn in a manner that is most helpful in understanding the present invention. However, the order of description should not be construed as to imply that these operations are necessarily performed in the order that they are presented, or even order dependent. Lastly, repeated usage of the phrases "in one embodiment," "an alternative embodiment," or an "alternate embodiment" does not necessarily refer to the same embodiment, although it may.

Figure 1A:
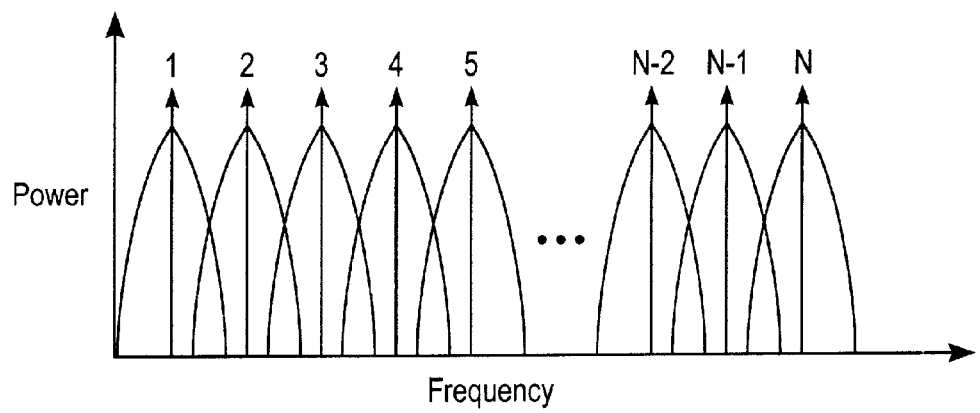
FIG. 1a illustrates the frequency spectrum of multiple modulated subcarriers in an OFDM system.
Figure 1B:
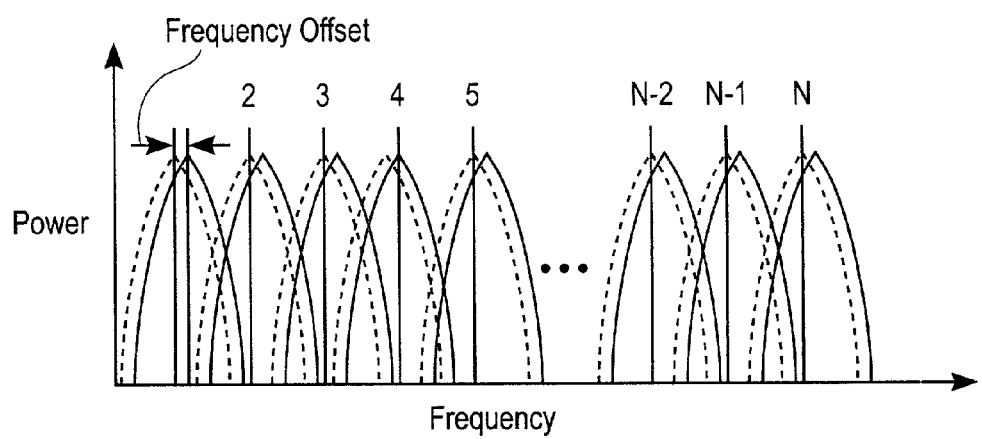
FIG. 1b illustrates the effect of the lack of synchronization on the frequency spectrum of multiple subcarriers.
Figure 2:
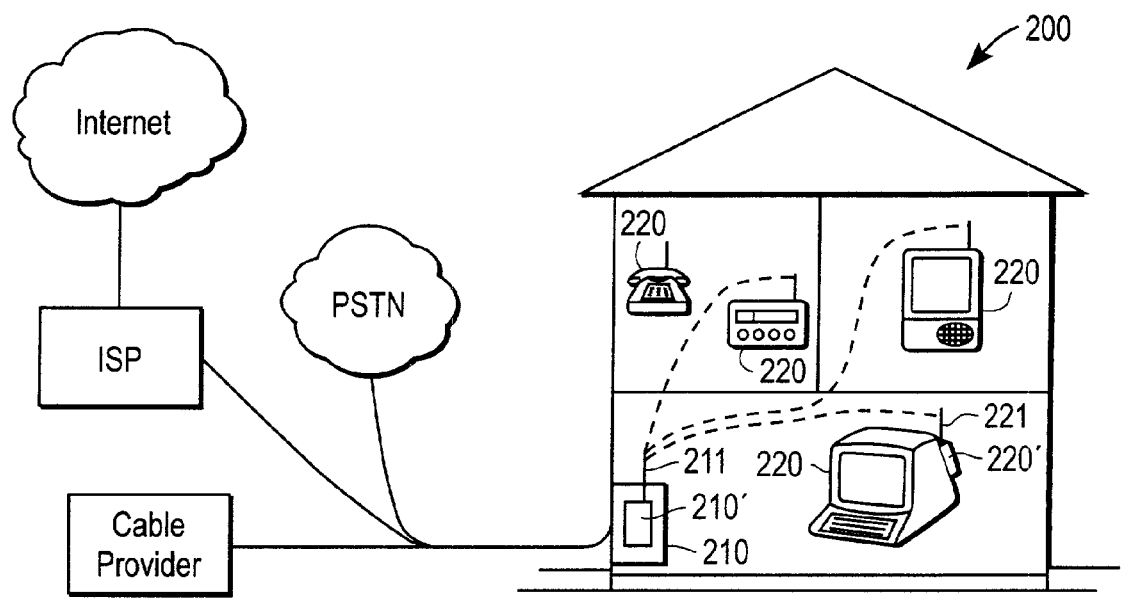
FIG. 2 illustrates a communication system according to one embodiment of the present invention.

FIG. 2 illustrates a communication system according to one embodiment of the present invention. System 200 includes a gateway 210 which is connected via a cable (or multiple cables) to the public switched telephone network (PSTN), a cable television system, an Internet service provider (ISP), or some other system. Gateway 210 includes a transceiver 210' and antenna 211. Appliance 220 includes a transceiver 220' and antenna 221. Appliance 220 could be a television, computer, telephone, or some other appliance. Transceiver 210' provides transceiver 220' with a wireless connection to the systems which are connected to gateway 210. According to one embodiment, transceivers 210' and 220' communicate in accordance with the IEEE 802.11a standard. Consequently, each of transceivers 210' and 220' includes a receiver and a transmitter that communicate information formatted according to the 802.11a standard. In alternative embodiments, as indicated below, transceivers 210' and 220' may have design features that deviate from the IEEE 802.11a standard. For example, the present invention can be practiced in a system that has a packet structure that is different from the 802.11a standard; e.g., different number of symbols having a known amplitude and phase, different organization and number of guard intervals, data symbols, long symbols. Furthermore, the present invention can be practiced with sampling rates specified by the standard or other rates, different pilot organization, and a different number of carriers, among other differences.

Figure 3:
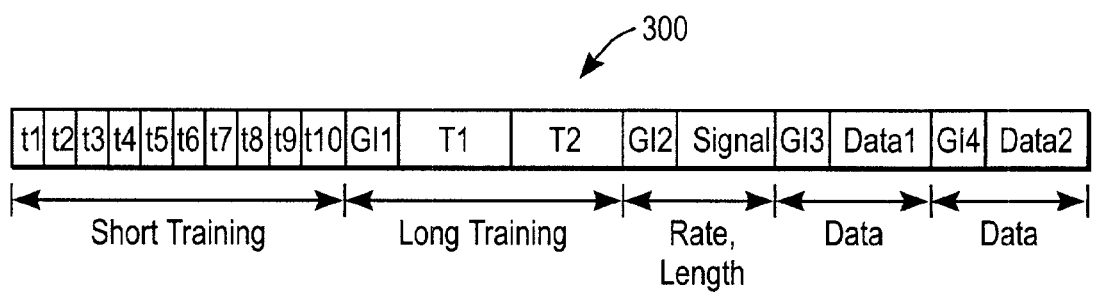
FIG. 3 illustrates the packet structure that the IEEE 802.11 a standard requires for information transmission between two transceivers.

FIG. 3 illustrates the packet structure that the IEEE 802.11a standard requires for information transmission between two transceivers. A receiver in transceiver 210' or 220' is designed to accept a packet such as packet 300 and to derive timing information, data, and other information from the packet. For example, in packet 300, the first 10 symbols (t1 to t10), which are referred to as the shorts, are repeated random sequences that a receiver uses for detecting symbol timing and coarse carrier frequency offset. GI1 is the cyclic prefix of the two long symbols T1 and T2, and is sometimes referred to as a guard interval because of its use as a rough inter-symbol boundary for absorbing the effect of multipath. GI1 is made long enough such that if short symbol t10 undergoes multipath, symbol t10 will partially "smear" into GI1 without affecting T1. T1 and T2, referred to as the longs, are used for channel estimation, fine frequency offset estimation, and fine symbol timing adjustment. Having a relatively accurate channel estimate is essential to proper decoding of data symbols. There are several factors that can affect channel estimation validity: changes between the long symbols, on which the channel estimate is based, and the data symbols, frequency offset between the receiver and transmitter, timing drift, and phase noise. The present invention provides for a channel estimate based on the long symbols to be adjusted based on successive estimates of pilot signals in a data symbol. The successive estimates allow the original channel estimate to be made updated despite the effects of magnitude change, phase noise, timing drift, and frequency offset.

According to one embodiment, each short symbol takes 0.8 µs, allowing altogether 8 µs to perform signal detection, automatic gain control (AGC) and coarse symbol timing and frequency offset estimation. According to one embodiment, GI1 takes 1.6 µs, twice the amount of the usual cyclic prefix between data symbols, to absorb the computation latency necessary in performing the above functions. After the shorts, GI1 provides a rough inter-symbol boundary which allows the two longs, T1 and T2, to be captured without multipath effects, as the relatively long GI1 is sized to provide an ample buffer zone to absorb any error in symbol boundary. According to one embodiment, T1 and T2 each take up 3.2 µs, and are used to derive two estimates of the channel characteristics, as the data bits transmitted in T1 and T2 are known at the receiver. The two channel estimations are combined and manipulated to form a reference channel estimate for the following data symbols. After the longs, the packet enters into data symbols. Each data symbol is 3.2 µs long and preceded by a cyclic-prefix of 0.8 µs. The cyclic prefix is used to absorb delay spread caused by multipath so that the OFDM symbols can remain orthogonal. The first symbol is a SIGNAL symbol, which is, according to one embodiment, transmitted in binary phase shift keying (BPSK) with a ½-rate code. The SIGNAL symbol is transmitted in BPSK because all systems will be able to communicate in the BPSK ½ rate code, but all may not be able to communicate in quadrature amplitude modulation. The SIGNAL symbol needs to be detected correctly, as it contains the information needed for decoding the rest of the packet, hence the use of BPSK with the ½-rate code. The data symbols can be transmitted in BPSK, quaternary phase shift keying (QPSK), 16-quadrature amplitude modulation (QAM), or 64-QAM with various degrees of error correction, to provide a scaleable set of data rates in response to different channel conditions.

Figure 4A:
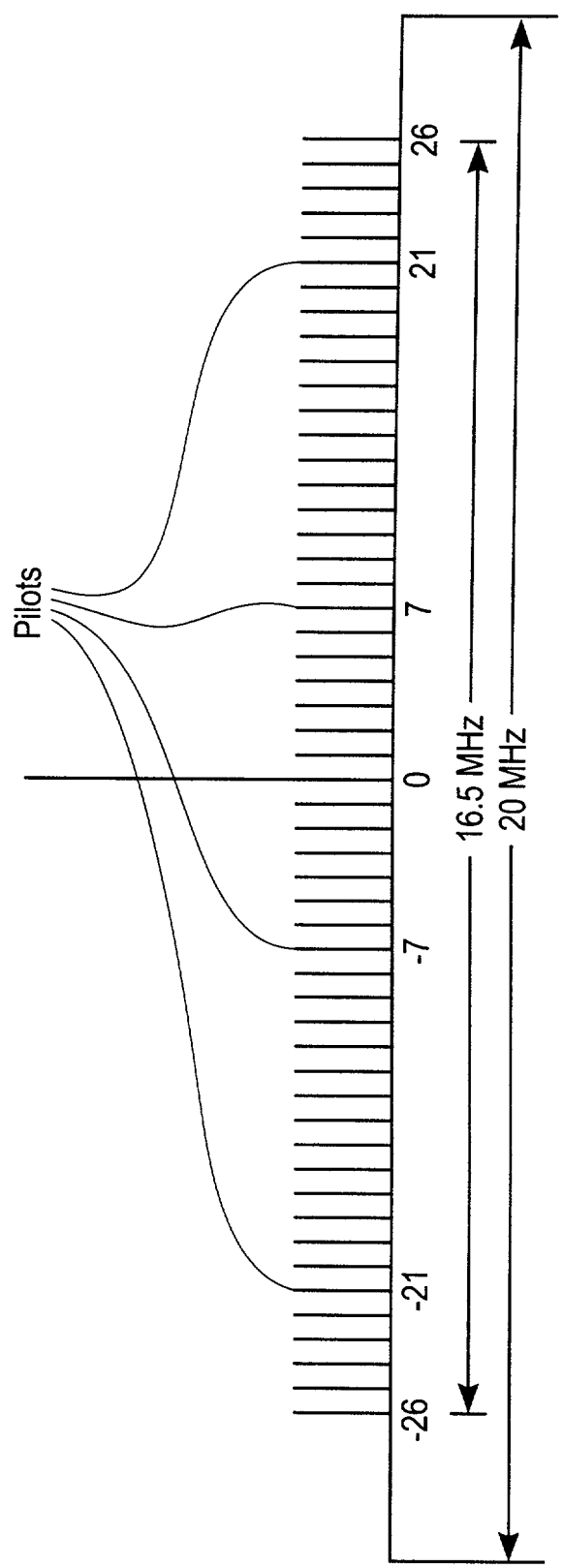
FIG. 4a illustrates subcarriers and pilots of an OFDM signal in accordance with the 802.11a standard.

FIG. 4a illustrates subcarriers and pilots of an OFDM signal in accordance with the 802.11a standard. According to the 802.11a standard an OFDM signal has 52 subcarriers. The 52 subcarriers are numbered from −26 to +26 and occupy 16.5625 MHz of the 20 MHz bandwidth allocated to one 802.11a channel. The 0 subcarrier is ignored because direct current at the receiver prevents reliable transmission of information on that subcarrier. For an OFDM long symbol signal, all the 52 subcarriers have a known amplitude and phase which allows a channel estimate to be determined for communication between a transmitter and receiver. In a long symbol, four of the 52 subcarriers are referred to as pilot signals even though all the subcarriers behave like pilot signals because their amplitude and phase are also known. The +/−21 and the +/−7 subcarriers are pilot signals. In contrast, for an OFDM data symbol, 48 of the 52 subcarriers are non-deterministic data carriers, while the remaining 4 carriers are pilot signals whose amplitude and phase are known.

According to one embodiment, a channel estimate is derived from the long symbols by taking a fourier transform of samples of the long symbols. The fourier transform of the long symbol samples is the frequency domain representation of the long symbols as received at the receiver after modification by the channel between the receiver and transmitter. Since the long symbols have a known amplitude and phase, the frequency domain representation of the long symbols as transmitted by the transmitter can be and is stored at the receiver. According to one embodiment, the channel estimate is derived by simply taking the quotient of the frequency domain representation of the long symbols as received at the receiver and the frequency domain representation of the long symbols as transmitted by the transmitter.

By inverting the channel estimate, the phase and magnitude correction factor for each subcarrier can be determined. The correction factors of the inverted channel estimate are used to correct the frequency domain representation of each data symbol that is received at the receiver. The frequency domain representation of each data symbol is a sequence of complex values, where each complex value is representative of the phase and amplitude of a data symbol subcarrier as received at the receiver. For each data symbol subcarrier the correction factor is a complex value which is used to make an adjustment to the phase and amplitude of the data symbol subcarrier.

With time, due to phase noise, timing offset, and frequency offset, the correction factors become inaccurate and prevent accurate decoding of a received data symbol. The present invention provides mechanisms for adjusting the inverted channel estimate, both magnitude and phase, so that the data symbols can be accurately decoded.

The mechanisms involve, monitoring the total change in phase of each pilot in a data symbol and monitoring the intersymbol change in the average power of the pilots. By monitoring how the total change in phase of each pilot in a data symbol changes over time in comparison to the corresponding pilot of the long symbols, the effects of phase noise, timing drift, and frequency offset between the receiver and transmitter can be accounted for and the inverse channel estimate adjusted. Additionally, by monitoring the change in the average power of the pilots of a data symbol in comparison to the average power of the pilots of the long symbols, the effect of changes in magnitude can be accounted for and the inverse channel estimate adjusted.

Figure 4B:
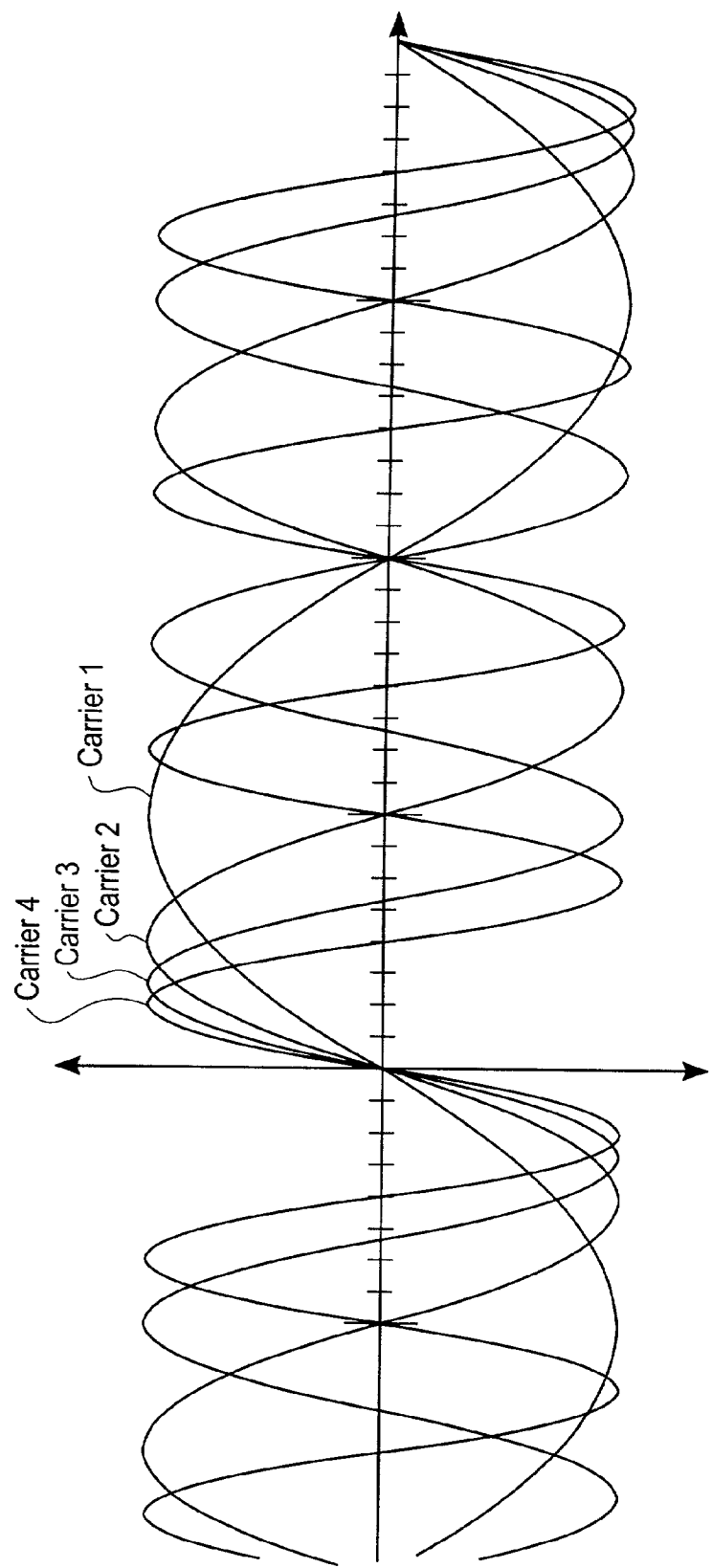
FIG. 4b illustrates several discrete waveforms that together form a part of an OFDM signal in accordance with the 802.11a standard.

FIG. 4b illustrates several discrete waveforms that together form a part of an OFDM signal in accordance with the 802.11a standard. While all the waveforms are shown to be of equal amplitude and phase, it should be appreciated that other waveforms with unequal amplitudes and phases are possible and are encompassed by the present invention. Assume for the purposes of the discussion that the waveforms are representative of the waveforms of a long symbol. If the long symbol is sampled early, the phase of each waveform will be proportional to the product of the frequency of the waveform and the number of samples (i.e., clock cycles) that the sampling of the waveforms is early. There is a linear relationship between the angle of a subcarrier and the timing offset measured in the number of clock cycles by which the sampling is early. Assuming a 40 MHz sampling rate, for every 128 clock cycles subcarrier 1 completes one cycle. Consequently, for every clock cycle that subcarrier 1 is sampled early the phase of the subcarrier is rotated by −π/64. So, for example, if the symbol timing were early by one clock cycle, we would expect subcarrier 3 to rotate by −π/64 radians, and subcarrier −3 to rotate by −π/64 radians. The amount of rotation in radians, generally, is given by equation 1.0 below.

$$\text{Rotation} = -(\text{Numclocks\_early})(\text{Subcarrier\_number})\pi/64 \qquad \text{Equation 1.0}$$

Numclocks_early is the number of clock cycles by which the symbol timing is off. Subcarrier_number is the number of the subcarrier for which rotation is to be determined. As indicated above, Subcarrier_number varies from −26 to +26.

Figure 4C:
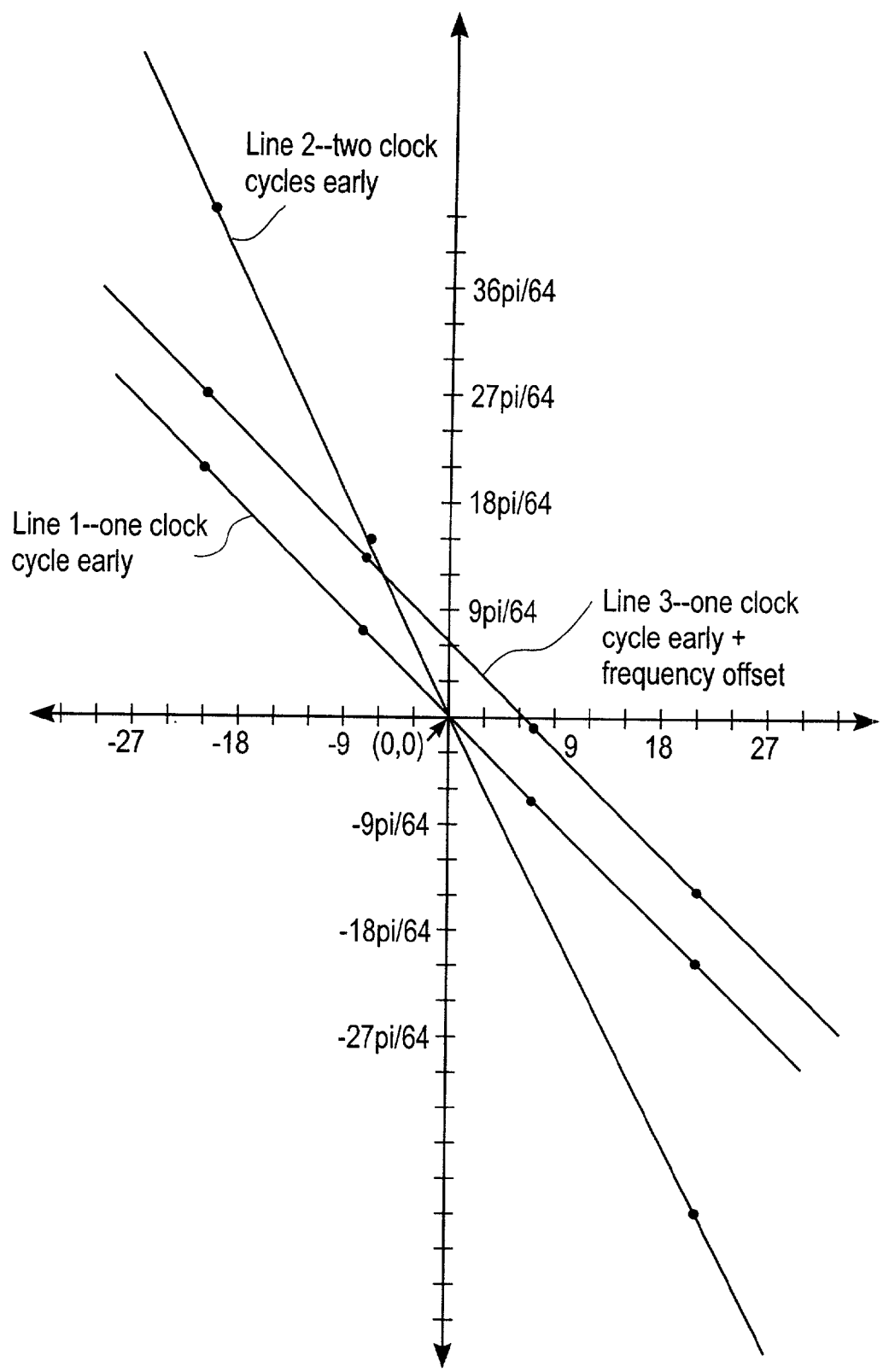
FIG. 4c illustrates a graph of the total change in phase of pilots versus subcarrier number for early sampling by various clock cycles.

FIG. 4c illustrates a graph of the total change in phase of pilots versus subcarrier number for early sampling by various clock cycles. Line 1 is the line through the points associated with each pilot where sampling is one clock cycle early. Line 2 is the line through the points associated with each pilot where sampling is two clock cycle s early. Line 3 is the line through the points associated with each pilot where sampling is one clock cycle early and there is a frequency offset between receiver and transmitter. As shown in FIG. 4b, the waveforms are not influenced by a frequency offset between the receiver and transmitter. Had there been a frequency offset, the waveforms of FIG. 4b would have been either compressed or expanded. Assuming that there is a frequency offset, it would affect the phase of all the subcarriers equally. In terms of the pilots of FIG. 4c, the phases of each of the pilots would increase by the same amount which translates in a simple shift up or down along the phase axis. Consequently, line 3 is simply a shifted version of line 1.

Figure 4D:
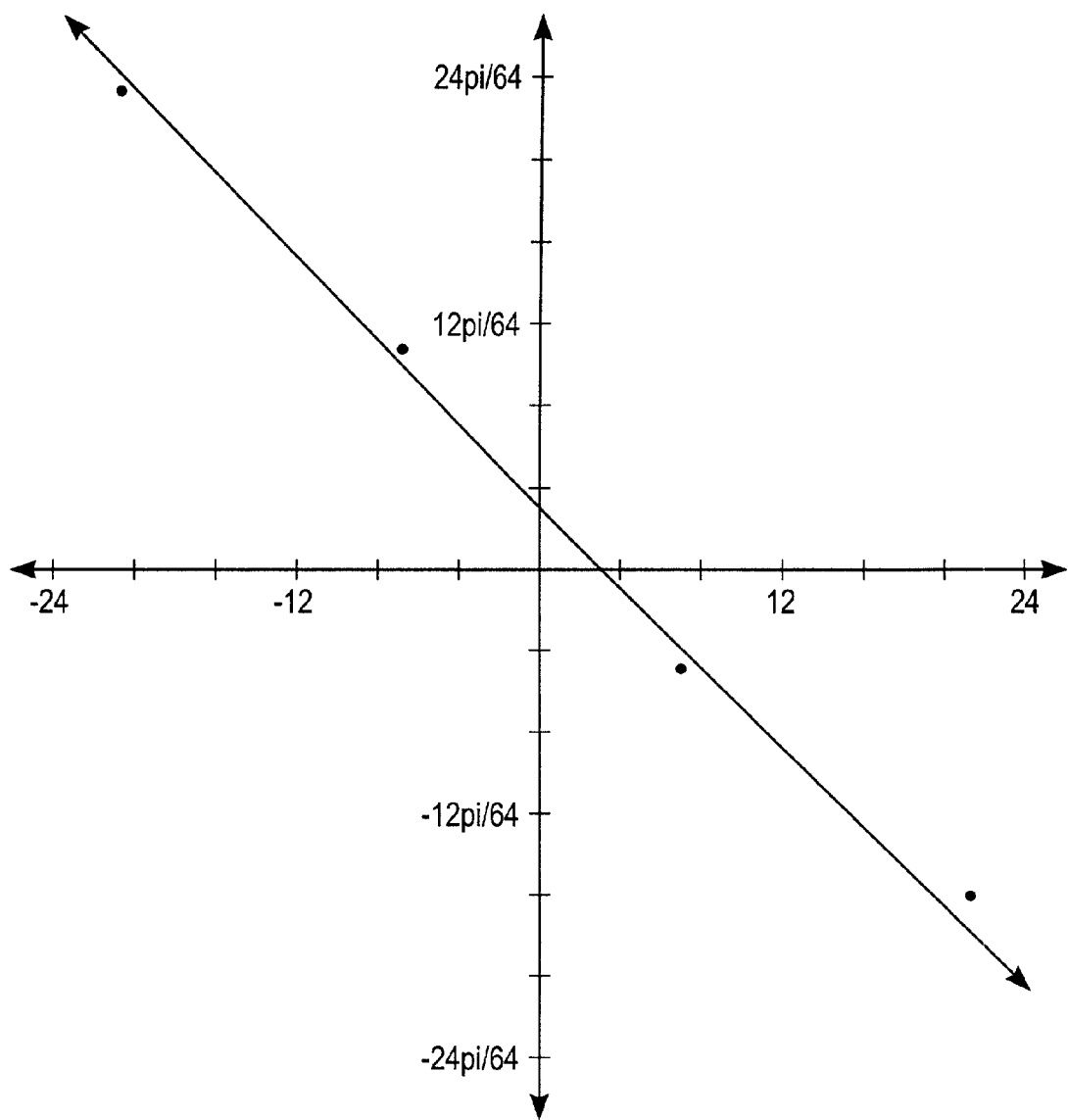
FIG. 4d illustrates a graph of the total change in phase of each pilot of a data symbol, relative to the corresponding pilot in the long symbols, versus subcarrier number in the presence of phase noise, timing drift, and frequency offset.

FIG. 4d is an illustrative graph of a possible change in phase of each pilot of a data symbol, relative to the corresponding pilot in the long symbols, versus subcarrier number in the presence of phase noise, timing drift, and frequency offset. The effect of phase noise, timing offset, and frequency offset, can be compensated for by first determining the slope and phase intercept of a line that will produce a least squares fit between the line and the actual phase plots (the four dark points on the graph). The change in phase of the subcarrier in a data symbol relative to the corresponding subcarrier in the long symbols can be determined using a simple equation such as $tdp_i = (\text{slope})i + \text{phase intercept}$, where $tdp_i$ is the total rotation of the $i^{th}$ subcarrier relative to the $i^{th}$ subcarrier of the long symbols and i is between −26 and +26 inclusive. A unit vector with an angle equal to $-tdp_i$ is the phase correction factor that needs to be multiplied with the $i^{th}$ subcarrier in the inverse channel estimate in order to adjust the $i^{th}$ subcarrier for phase noise, frequency offset and timing offset. For example, in FIG. 4d, the slope of the least squares fit line through the pilots indicates a timing offset of one clock cycle. Moreover, the line indicates that there is frequency offset because it does not pass through point (0,0) on the graph. The intercept of the line and the phase axis divided by the time elapsed since the channel estimate was made gives an indication of the frequency offset estimation error. The inverse channel estimate can be adjusted to account for phase noise, timing offset, and frequency offset by rotating each subcarrier in the inverted channel estimate by the negation of the total rotation of the corresponding subcarrier that is derived from the least squares fit line.

Figure 5:
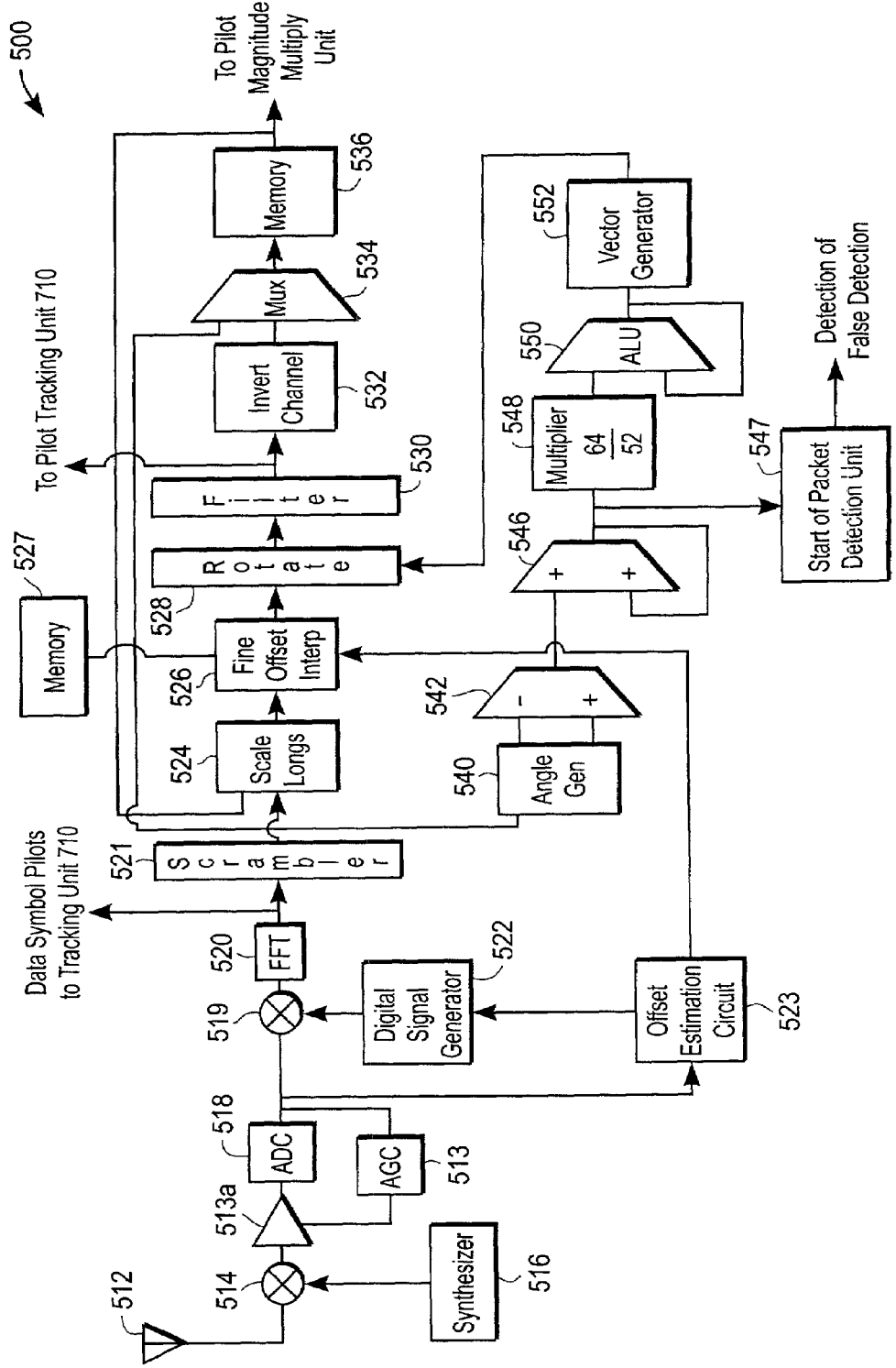
FIG. 5 illustrates a receiver in accordance with an embodiment of the present invention.

FIG. 5 illustrates a receiver in accordance with an embodiment of the present invention. Receiver 500 includes an automatic gain control (AGC) circuit 513, a variable gain amplifier (VGA) 513a, antenna 512, an analog mixer 514, a synthesizer 516, and an analog-to-digital converter (ADC) 518. Antenna 512 receives a packet such as packet 300 described above in the form of an analog signal transmitted by a transceiver such as transceiver 210' or 220' described above. Depending on the frequency with which transceiver 210' and 220' are communicating, synthesizer 516 produces a synthesizer signal with a frequency such that when the signal received at antenna 512 is multiplied with the synthesizer signal by mixer 514, a baseband version of the analog signal is produced by mixer 514. Since the baseband analog signal is likely to be weak, VGA 513a amplifies the baseband analog signal to produce an amplified baseband analog signal.

The ADC 518 samples and digitizes the amplified baseband analog signal to produce digital samples of the amplified baseband analog signal. Since the amplified baseband analog signal is likely to have a varying amplitude due to changes in the strength of the received signal at antenna 512, the amplitude of the digital samples are likely to vary as well. For proper operation of the subsequent stages of the receiver, it is preferable that the amplified baseband analog signal have a relatively constant amplitude before digital samples are taken. A relatively constant amplitude is achieved by AGC 513 processing the digital samples produced at the output of ADC 518 to produce a correction signal to VGA 513a to adjust the degree of amplification. Typically, the first 5 or 6 short symbols that are received are used to settle AGC 513 and are not used to produce a coarse offset estimate of the offset between the synthesizers in the transmitter and the receiver. Depending on the design of the communication system, a certain number of the 10 shorts are not needed to settle AGC 513. The shorts that are not needed for automatic gain control can be used for coarse offset estimate and for coarse symbol timing. When the analog signal received is the shorts that are not needed for automatic gain control, mixer 514 produces at its output a replica of the shorts but at baseband, and VGA 513a produces an amplified replica of the baseband short symbols. According to one embodiment, ADC 518 takes 16 samples of each amplified baseband short symbol which translates into a rate of 20 million samples/second. In an alternative embodiment, ADC 518 takes 32 samples of each short symbol which translates into a rate of 40 million samples/second. Digital mixer 519 multiplies the digital samples of the shorts with the output of digital signal generator 522. Since there can be no indication of the offset until a packet is received and analyzed, signal generator 522 initially has as an output a unit vector which has zero frequency.

Generator 522 receives from offset estimation circuit 523 estimates of the frequency offset between the receiver and transmitter. Generator 522 produces periodic signals with frequencies based on the frequency offset between the receiver and transmitter. Offset estimation circuit 523 produces a coarse offset estimate and a fine offset estimate based on the short symbol samples and long symbol samples, respectively, produced by ADC 518. When a coarse offset estimate using the short symbols is determined by offset estimation circuit 523, signal generator 522 produces a periodic digital signal with a frequency based on the coarse offset estimate for application to multiplier 519. Multiplier 519 multiplies the long symbols that follow the short symbols with the periodic signal based on the coarse offset estimate to compensate for the mismatch between the transmitter and receiver. When a fine offset estimate using the long symbols is determined by circuit 523, signal generator 522 produces a periodic digital signal with a frequency based on the fine offset estimate. Multiplier 519 multiplies the data symbols that follow the short symbols with the periodic signal based on the fine offset estimate. The operation of generator 522 and offset estimation circuit 523 is described in greater detail in "Method And Circuit Providing Fine Frequency Offset Estimation and Calculation" with Ser. No. 09/963,115 and a filing date of Sep. 24, 2001.

When the first long symbol arrives, mixer 519 multiplies samples of the long symbol produced by ADC 518 with the periodic signal with frequency based on the coarse offset estimate. The product of mixer 519 is applied to fast fourier transform (FFT) unit 520. FFT unit 520 produces a frequency domain representation of the first long symbol. The frequency domain representation of the first long symbol is applied to scrambler 521. Scrambler 521 multiplies every bin of the frequency domain representation of the first long symbol (and the second long symbol when it is produced by FFT unit 520) by either +/−1 as specified in Section 17.3.3 of 802.11a D7.0 (1999), Draft Supplement to Standard for Lan/Man Part II: MAC and Phy specification. Scrambler 521 multiplies the pilots of the data symbols by +/−1 as specified by section 7.3.5.9 of 802.11a D7.0 (1999). The output of scrambler 521 is applied to an input of multiplexer 534. Multiplexer 534 outputs the frequency domain representation of the first long symbol to memory 536 for storage.

The output of scrambler 521 is also applied to angle generator 540. Angle generator 540 takes a complex value and produces an angle for each sample of the scrambled frequency domain representation of the first long symbol. According to one embodiment, generator 540 implements the cordic algorithm for doing the vector to angle conversion. The angle of each sample of the scrambled frequency domain representation of the first long symbol is applied to angle difference generator 542. According to one embodiment the frequency domain representation of the first long symbol has 128 samples. The number of samples is a design consideration and values other than 128 are possible, (e.g., 64 samples) For purposes of illustration only, the samples are numbered from −64 to +63. The samples from −26 to +26 are representative of the frequency domain representations of the signals in the 52 subcarriers. Samples −37 to −27 and 27 to 37 are representative of the frequency domain representation of the guard bands between a 802.11a channel and its adjacent channels on either side.

Beginning with sample −26 and ending with sample 26, difference generator 542 produces the difference in angle between two consecutive samples of the frequency domain representation of the first long symbol. Sample 0 is ignored because its phase is not correlated with the subcarrier phase of other samples. Consequently, difference generator 542 produces the phase difference between subcarriers −1 and +1. The differences in angles produced by difference generator 542 are applied to accumulator 546. Accumulator 546 adds up the differences in angles produced by generator 542 for samples −26 through sample 26 to produce a sum of the differences in angles for these samples (AccumAngle in Equation 2.0 below). Equation 2.0, below, represents the calculation that is performed by accumulator 546 to produce the sum of the differences in angles for the samples of the subcarriers.

$$AccumAngle = \sum_{i=-26}^{25} ((phase(subcarrier_{i+1}) - (phase(subcarrier_i) + \pi) \bmod 2\pi) - \pi \quad \text{Equation 2.0}$$

The $\pi) \bmod 2 \pi) - \pi$ arithmetic simply causes each incremental difference to be within $-\pi$ and $+\pi$.

Boundary detection circuit 547 evaluates AccumAngle to determine whether a packet is being received and generates a false detection indication when AccumAngle has a value that indicates that a packet is not being received. AccumAngle should be within a certain range if in fact a long symbol is being processed. According to one embodiment, if AccumAngle is not between $-32\pi$ and $-long1\_thres* \pi$, where long1_thres can have values 0,2, 4, or 8, circuit 547 generates a false detection indication, the processing of the received signal is discontinued and the receiver returns to waiting for a packet to be received. When AccumAngle is not between $-32\pi$ and $-long1\_thres* \pi$ a false detection of a packet has occurred.

AccumAngle is scaled by a factor of 64/52 by scaler 548 to reflect the sum of the differences that would have been calculated had there been 64 instead of 52 subcarriers. The sum of the differences produced by scaler 548 gives an indication of how many clock cycles the long symbol was sampled too early (i.e., the number of samples by which the original timing estimate for the start of the long symbol was off).

As indicated above, there is a linear relationship between the angle of a subcarrier and the timing offset measured in the number of clock cycles by which the sampling is early. For every 128 clock cycles subcarrier 1 completes one cycle. Consequently, for every clock cycle that subcarrier 1 is sampled early the phase of the subcarrier is rotated by $-\pi/64$. So, for example, if the symbol timing were delayed by one clock cycle, we would expect subcarrier 21 to rotate by $21\pi/64$ radians, and subcarrier $-21$ to rotate by $-21\pi/64$ radians.

When the second long symbol arrives and scrambler 521 produces a scrambled frequency domain representation of the second long symbol, scrambler 521 applies the scrambled frequency domain representation of the second long symbol to long symbol scaling circuit 524. Also scaling circuit 524 retrieves from memory 536 the frequency domain representation of the first symbol. According to one embodiment scaling circuit 524 averages the channel estimate for each subcarrier in the frequency domain representations of the first long symbol and second long symbol. The process of averaging is represented by equation 3.0 below.

$$AvgSubcarrier_i = \frac{FirstLongSubcarrier_i + SecondLongSubcarrier_i}{2} \quad \text{Equation 3.0}$$

The averaging is performed for i=−26 to +26. After averaging the frequency domain representations of the first and second long symbols to produce an averaged frequency domain representation, the averaged frequency domain representation is provided to the fine offset circuit 526. In an alternative embodiment, the averaged frequency domain representation may be scaled as described below before being provided to circuit 526.

Fine offset circuit 526 adjusts the averaged frequency domain representation to remove the effect of the residual offset between the transmitter and the receiver on the frequency domain representations of the first and second long symbols. Circuit 526 receives from offset estimation circuit 523 a fine offset estimate that is indicative of any residual offset between the transmitter and receiver and that is derived from the long symbols. Since the frequency domain representation of the first and second long symbols was derived from signals that were adjusted using the coarse offset estimate, they may contain a residual offset whose effect on the long symbols needs to be removed. As indicated above, the operation of offset estimation circuit 523 and signal generator 522 are described in greater detail in "Method And Circuit Providing Fine Frequency Offset Estimation and Calculation" with Ser. No. 09/963,115 and a filing date of Sep. 24, 2001. The operation of circuit 526 will be described in greater detail below.

According to an alternative embodiment, scaling circuit 524 adds each subcarrier in the frequency domain representation of the first long symbol to its corresponding subcarrier in the frequency domain representation of the second long symbol to produce a sum of the frequency domain representations of the first symbol and the second symbol. The process of producing the sum of the frequency domain representations of the first symbol and the second symbol is described by equation 4.0 below.

$$SumofSubcarrier_i = FirstLongSubcarrier_i + SecondLongSubcarrier_i \quad \text{Equation 4.0}$$

The summation is performed for i=−26 to +26. After summation, the values of SumofSubcarrier may be adjusted to decrease the effect of quantization noise that may be injected into the process of producing a channel estimate from the long symbols by subsequent circuits that follow circuit 524. For example, if the values of SumofSubcarrier are in block floating point format they can be shifted as described below such that they take up as much as possible the word length of the registers which perform the operations necessary to produce the channel estimate without causing overflow.

Figure 6A:
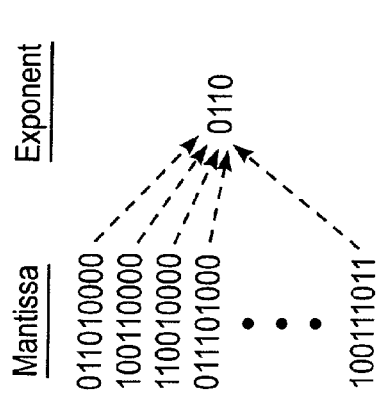
FIG. 6a illustrates numbers represented in block floating point format.

FIG. 6a illustrates numbers represented in block floating point format. In block floating point format a block of numbers (i.e., several mantissas) share one exponent. Assuming the output of unit 521 is due to receipt of the first long symbol and the second long symbol at the receiver, unit 524 puts out numbers which are the frequency domain representations of the long symbols and which are formatted in accordance with the block floating point format. The number of bits in the mantissa and exponent is a design consideration, and the present invention encompasses many different combinations. For purposes of illustration only, according to one embodiment, the mantissa is 16 bits long and the exponent is 5 bits long. According to one embodiment, adders and multipliers which perform operations on the 16-bit numbers use 17 bit registers for the mantissas and 5 bit registers for the exponents. Since, in performing computations, it is desirable for purposes of minimizing loss of information to use as much of the word length of the registers as possible without causing an overflow, if the numbers produced by unit 521 are relatively small it is beneficial to have them scaled so that they use as much of the word length as possible. The amount of scaling is dependent upon how much 'headroom' is needed in order to avoid overflow. For example, if mantissas are 16-bits long, numbers are scaled up to the $14^{th}$ bit, with two bits left for headroom.

Figure 6B:
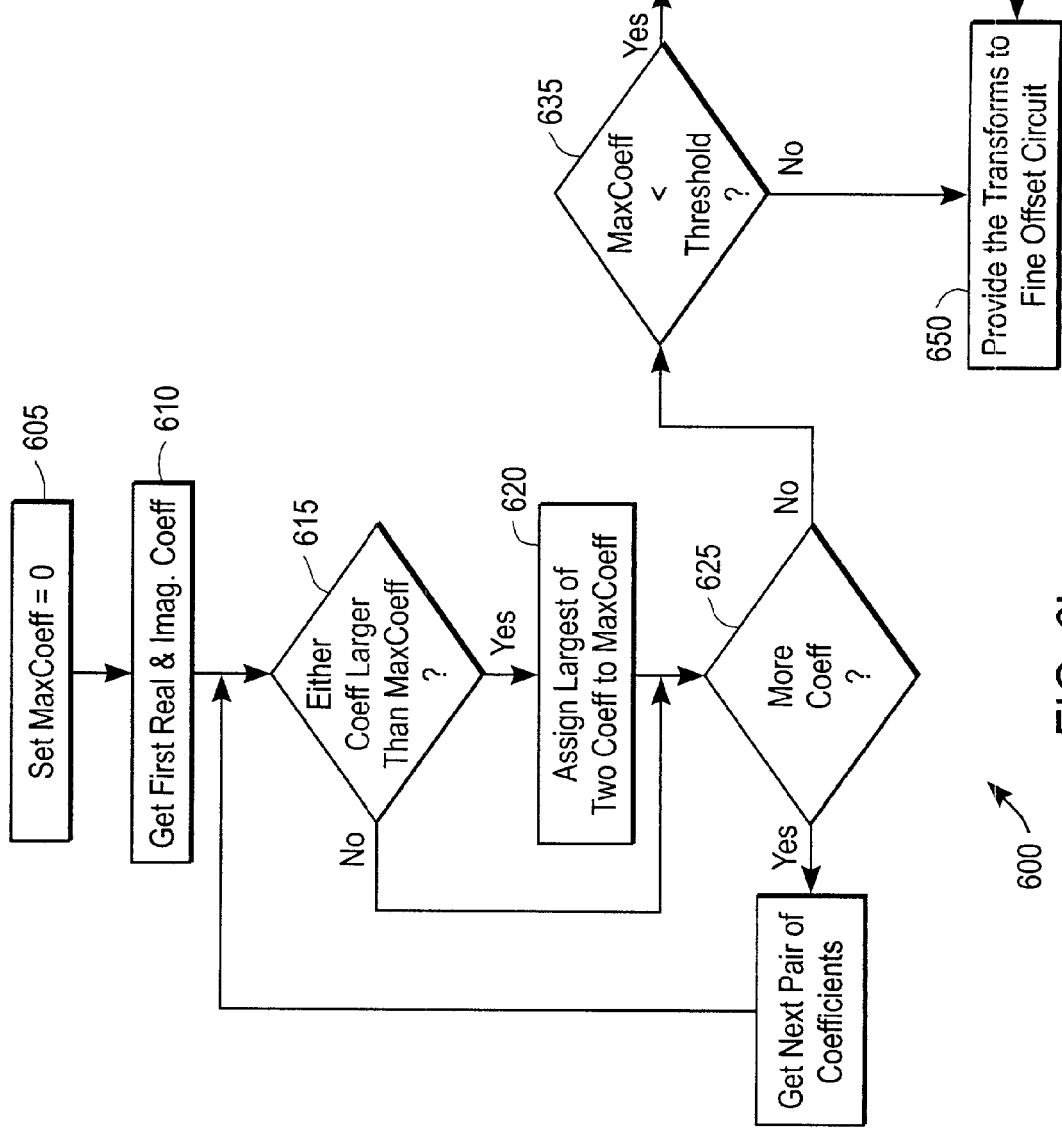
FIG. 6b illustrates a process by which a frequency domain representation is adjusted to minimize loss of information due to subsequent operations on the representation.

FIG. 6b illustrates a process for scaling a frequency domain representation of a signal to minimize loss of information. According to one embodiment, circuit 524 performs a process such as process 600. Circuit 524 sets 605 variable MaxCoeff to 0. Circuit 524 then retrieves 610 the coefficients of $SumSubcarrier_1$, and examines 615 the absolute value of the size of each of the coefficients to determine if either is greater than MaxCoeff. If either is larger than MaxCoeff, circuit 524 assigns 620 the largest of the two coefficients to MaxCoeff. Circuit 524 then determines 625 whether more coefficients need to be compared to MaxCoeff. If there are more coefficients to be compared, circuit 524 determines 615 whether either of the coefficients is greater than MaxCoeff. If there are no more coefficients to compare, circuit 524 determines 635 whether MaxCoeff is greater than a threshold that has been selected so that numbers can be properly represented by the registers during calculations involving the numbers. According to one embodiment, the threshold is the number which has the $14^{th}$ bit set, or 16,384. If MaxCoeff is less than the threshold, circuit 524 determines 640 the minimum numbers of left shifts of MaxCoeff that will make MaxCoeff greater than or equal to the threshold. After determining the minimum number of left shifts, circuit 524 left shifts 645 each coefficient for all $SumSubcarrier_j$ by the minimum number of left shifts and adjusts the exponent of the block to reflect that the coefficients have been left shifted. Then, circuit 524 provides the left-shifted coefficients to fine offset circuit 526. If MaxCoeff is greater than the threshold, circuit provides 650 the coefficients received from unit 524 to fine offset circuit 526.

While in the above description block floating point format is used to represent samples of signals, it should be appreciated that the present invention encompasses use of other formats, some of which may require manipulation in order to minimize information loss.

As indicated above, since the digital long samples which were fast fourier transformed by FFT unit 520 were multiplied by a signal with a frequency equal to the coarse offset estimate, the frequency domain representation of the long symbols produced by scaling circuit 524 may not be a very accurate representation of the actual transmitted signal as transformed by the channel. The inaccuracy is partly due to the presence of a residual frequency offset in the frequency domain representation of the long symbols. The residual frequency offset can be estimated and compensated for using the fine offset estimate. To compensate for the residual frequency offset, circuit 526 convolves the sum, average, or scaled average of the scrambled frequency domain representations of the individual long symbols with a frequency domain representation of a signal that has a frequency equal to the fine offset estimate, fo. The frequency domain representation of a sine wave that is sampled for a finite period of time has the general shape of $\sin(x)/x$, where $x=\pi fT$ and T is the duration of a long symbol (e.g., 3.2 μs). The frequency domain representation of the sine wave varies as a function of fo. According to one embodiment, circuit 526 convolves three samples of the frequency domain representation of a sine wave, with frequency equal to the fine offset estimate, with the frequency domain representation of the long symbols as produced by circuit 524. The three samples of the frequency domain representation of the sine wave with frequency equal to fo are retrieved from memory 527 by fine offset circuit 526. In order to perform the convolution as rapidly as possible, memory 527 stores a table that has for various values of frequency, f, associated samples of the frequency domain representation of a sine wave with frequency equal to f. To retrieve the appropriate samples, circuit 526 indexes into the table based on fo. According to one embodiment, in the event that fo falls between two values of f in memory 527, circuit 526 retrieves the samples that are associated with the two values. Circuit 526 then interpolates between each sample of one value and the corresponding sample of the other value to produce an interpolated sample value. It should be appreciated that in an alternative embodiment interpolation may not be necessary because the table would have a very small step size between the various values of fo making it acceptable to simply choose the samples for the fo that is closest to the fine offset estimate being used as an index into the table. Circuit 526 then convolves the interpolated sample values with the frequency domain representation of the long symbols as received from scaling circuit 524. The output of circuit 526 is a frequency domain representation of the long symbols as received at the receiver and as adjusted for frequency offset between the transmitter and receiver. The output of circuit 526 is then provided to rotator 528.

As indicated above, if the timing of the long symbols is early, a least squares fit of a line through the phases of the pilots will be a line with a negative slope. It is very likely—and even desirable—that the sampling of the long symbols be early. Consequently, a plot of the phases of the pilots of the frequency domain representation of the long symbols produced by circuit 526 is likely to resemble four points which can have a least squares fit line with a negative slope passed between them, as in FIG. 4c. To produce a channel estimate with a flat phase response as a baseline, the phase of each subcarrier in the frequency domain representation of the long symbols needs to be corrected by multiplying each subcarrier by a vector whose angle is a function of the subcarrier number and the number of clock cycles the sampling was early.

To produce the flat phase response, arithmetic logic unit (ALU) 550 calculates the phase correction for subcarrier −26 (i.e., −(−26)π(number of samples early)/64) and provides it to vector generator 552 which produces a vector with an angle equal to the phase correction for subcarrier −26. Rotator 528 then multiplies the vector produced by generator 552 with the complex value for subcarrier −26 that is produced by fine offset circuit 526. To calculate the phase correction for subcarrier −25, ALU 550 simply adds −π(number of samples early)/64 to the phase correction for subcarrier −26. Vector generator 552 provides a vector with an angle equal to the phase correction for subcarrier −25 to rotator 528. ALU 550 repeats the process of adding −π(number of samples early)/64 to the previous phase correction that was calculated in order to generate the phase corrections up to subcarrier +26.

The output of the rotator 528 is a frequency domain representation of the long symbols which has been adjusted for both frequency offset and timing offset (i.e., flat phase response). Since the frequency domain representation produced by rotator 528 is likely to be noisy, according to one embodiment, the output of rotator 528 is filtered by a 7-tap finite impulse response filter (FIR) 530. One of ordinary skill in the art would appreciate that the nature of the FIR is a design consideration and that the present invention encompasses FIR with a number of taps other than 7 and even filters other than FIRs.

The smoothed or filtered output of filter 530 is the channel estimate and it is inverted by inverter 532 to produce an inverted channel estimate. The inverted channel estimate is applied to multiplexer 534 which forwards it to memory 536 for storage and later use in decoding data symbols. The process of calculating the inverted channel estimate is described by equation 5.0 below.

$$ChannelInverse_i = \frac{1}{I_i + jQ_i} = \frac{I_i - jQ_i}{I_i^2 + jQ_i^2} \qquad \text{Equation 5.0}$$

Where i varies from −26 to +26 and $I_i+jQ_i$ is the complex output of filter 530 for the $i^{th}$ subcarrier.

Returning to the output of filter 530, in addition to the filtered samples of the data subcarriers, filter 530 produces four filtered pilot signals. The four filtered long symbol pilot signals are sent to a pilot tracking unit that also receives the pilot signals of data symbols and uses the long symbol and data symbol pilots to track both phase and magnitude changes in order to compensate for magnitude changes, phase noise, timing drift, and frequency offset error between the receiver and transmitter.

Figure 7:
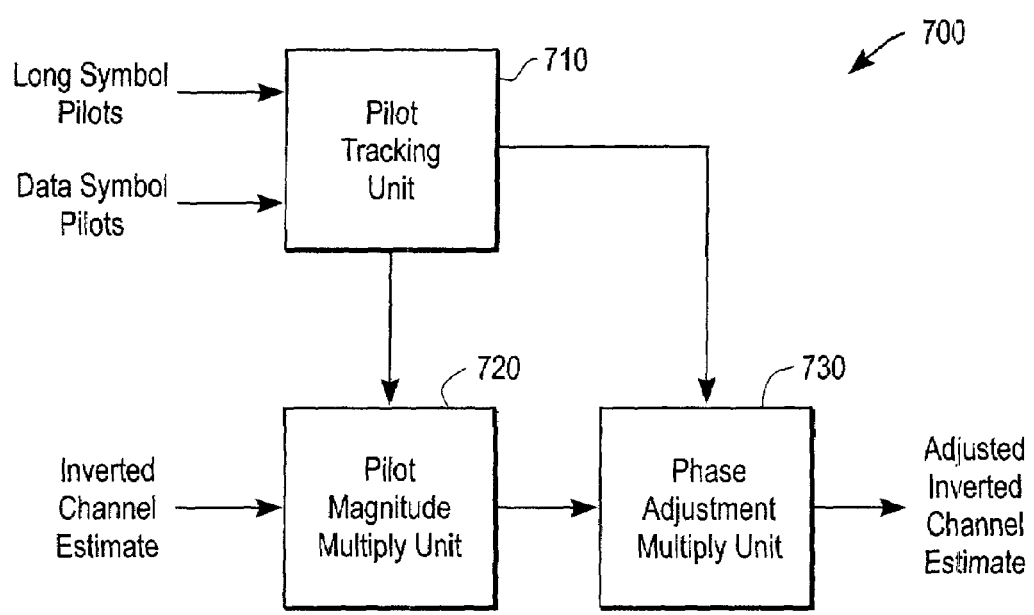
FIG. 7 illustrates a phase and magnitude tracking apparatus that produces an inverted channel estimate that has been adjusted for both phase and magnitude changes.

FIG. 7 illustrates a phase and magnitude tracking apparatus that produces an inverted channel estimate that has been adjusted for both phase and magnitude changes. Apparatus 700 includes pilot tracking unit 710 which tracks amplitude changes and phase changes. The phase of the pilots is not the only thing that changes during a frame of multiple data symbols in an OFDM signal. The magnitudes of the pilots may also change. In order to ensure proper decoding of data, according to one embodiment pilot magnitude variations are tracked and the inverted channel estimate is adjusted.

During receipt of a packet, the signal magnitude may vary due to the analog circuits or environmental factors. To account for pilot magnitude variations, a reference power must be first computed and saved. Unit 710 sums the powers of the 4 pilots of the long symbols and assigns them to a reference_power variable. The equation below represents calculation of the reference_power.

$$Power = \sum_{i=-21,-7,7,21} real(pilot_i)^2 + imag(pilot_i)^2$$

According to one embodiment, pilot power is then computed for the pilots of the SIGNAL symbol (data_or_signal_symbol_power) using the above equation and is compared to reference_power. The inverted channel estimate is scaled by scaling factor Mag which is represented by the equation below.

$$Mag = \sqrt{\frac{reference\_power}{data\_or\_signal\_symbol\_power}}$$

In the first data symbol, the pilot power of the pilots of the data symbol is compared to the reference power and the inverted channel estimate is scaled by the factor Mag using multiply unit 720. According to one embodiment, for data symbols after the first data symbol, the power of the pilots for the data symbol is filtered with a simple infinite impulse response filter: for example, filter_power[n+1]=presentdatasymbolpower/8+7*filter_power[n]/8. filter_power[n+1] is compared to the reference power, and Mag is calculated using filter_power[n+1]. The inverted channel estimate is then scaled by the factor Mag using multiply unit 720.

The scaling factor can be more easily evaluated in a base 2 system by performing the scale calculation in the log domain:

l gMag=0.5(log 2(reference_power)−log 2(data_or_signal_power));

and

Mag=2$^{lgMag}$

In a hardware implementation, the integer part of log2(n) is determined from the number of leading zeroes of the input; the fractional part via lookup table of the normalized input. According to one embodiment, the Mag output is computed in floating point format, the mantissa via lookup table of the lower bits of l gMag, and the exponent from the upper bits of l gMag. The Mag output is provided to multiplier 720 which scales the inverted channel estimate and provides the scaled inverted channel estimate to multiply unit 730.

Unit 710 also tracks phase changes using a single, unified mechanism. The mechanism involves, for each pilot of a data symbol, accumulation of the total change in phase relative to the phase observed in the long symbols to produce a total delta pilot (tdp). Making a least squares fit of the four tdps (one for each pilot) allows the tdp for each data subcarrier to be determined by a simple equation for a line that has the slope and phase offset determined by the least squares fit. The negated value of the tdp calculated for a given subcarrier is the amount by which the corresponding subcarrier of the inverted channel estimate (determined above at the output of memory 536) should be rotated.

As indicated above, pilot tracking unit 710 receives from filter 530 the complex values (I and Q components) for each of the four pilots in the long symbols. Pilot tracking unit 710 keeps track of the phase change between the pilots in the long symbols and the pilots in the data symbols. By keeping track of the phase changes, pilot tracking unit 710 is able to provide, for each data symbol that is received, indications of how the inverted channel estimate based on the long symbols needs to be adjusted to compensate for the timing drift, phase noise, and frequency offset that each data symbol is experiencing. To keep track of the phase changes, unit 710 maintains 7 variables for each of the pilots:

p=pilot phase of the previous symbol;
phi=pilot phase of the most recent symbol;
dp=delta_pilot, (the difference in pilot phase between two consecutive symbols);
ta=the amount of phase that needs to be added or subtracted from the phases of pilots due to timing having slipped from the desired timing backoff.

$$ta = \frac{subcarrier\_number(timing\_adjustment)\pi}{64}$$

where subcarrier_number takes on the values (−21,−7,+7,+21) and timing_adjustment is the number of clock cycles that the timing has slipped from the timing offset for the long symbols (permissible values are −1 (symbol timing sped up by a clock cycle), 0 (no timing adjustment), and +1 (symbol timing delayed by a clock cycle).

ndp=((phi−(p+ta)+π)mod2π)−π (new change in pilot phase, −π<=ndp<+π);

wrap_adjust=adjustment made to total change in phase for a pilot when the phase change over two consecutive pilots is greater than π radians. Condition of phase change over two consecutive pilots is greater than π radians is detected by evaluating pwt below and comparing it to the sum of ndp and dp:

pwt=π(1+pilot_wrap_threshold>>4), pilot_wrap_threshold is a configuration register which, according to one embodiment, holds values between 0 and 15 and >>is a right shift operation;

if (ndp+dp)>=pwt then wrap_adjust=−2π
else if (ndp+dp)<−pwt then wrap_adjust=2π
else wrap_adjust=0.

tdp=total amount of rotation of a pilot compared to the phase of the pilot from the long symbols;
tdp=(tdp+ta)+ndp+wrap_adjust.

After tdp is evaluated, previous pilot, p, and delta_pilot, dp, are advanced for each of the four pilots: i.e., p=phi, and dp=ndp.

After tdp is evaluated for each pilot, the least squares fit of the total delta pilots (tdp) is determined. The least squares fit produces a slope and a phase intercept (i.e., the tdp for the 0 data subcarrier) that allows simple calculation of the tdp of each data subcarrier by evaluating the equation of a line. The tdp for any data subcarrier is simply $tdp_i$=(slope)i+phase intercept. The slope is the variable EstimatedSlope below, and the phase intercept is the variable EstimatedOffset below. The equations for the least squares fit of n data points are:

$$EstimatedSlope = \frac{\sum X_i Y_i - \frac{1}{n} \sum X_i \sum Y_i}{\sum X_i^2 - \frac{1}{n}(\sum X_i)^2}$$

$$EstimatedOffset = \frac{1}{n}\left(\sum Y_i - EstimatedSlope \sum X_i\right)$$

$X_i$ are subcarrier numbers which have the values (−21,−7,7,21). $Y_i$ are the total delta pilots, and n=4. The above equations can be simplified because the pilot subcarriers are constant (31 21,−7,7,21). Thus, $\Sigma X_i$=−21−7+7+21=0

$\Sigma X_i^2$=(−21)²+(−7)²+7²+21²=980

$\Sigma X_i Y_i$=−21$tdp_0$−7$tdp_1$+7$tdp_2$+21$tdp_3$

Applying the above simplifications, results in $$EstimatedSlope = \frac{-3tdp_0 - tdp_1 + tdp_2 + 3tdp_3}{140}$$

$$EstimatedOffset = \frac{1}{4}(tdp_0 + tdp_1 + tdp_2 + tdp_3)$$

Where, $tdp_0$ is the total delta pilot for subcarrier −21, $tdp_1$ is the total delta pilot for subcarrier −7, $tdp_2$ is the total delta pilot for subcarrier 7, and $tdp_3$ is the total delta pilot for subcarrier 21.

According to one embodiment, in the event a pilot magnitude is low, its phase is determined by either interpolation or extrapolation from the phases of its two neighboring pilots and then the least squares fit is performed using the equations above as when all pilots are present and have sufficiently large magnitudes. Alternatively, a different least squares equation can be implemented for each of the four cases in which a pilot is ignored (i.e., only three points are used).

If $tdp_0$ is to be discarded, $tdp_0$=2$tdp_1$−$tdp_2$.
If $tdp_1$ is to be discarded, $tdp_1$=($tdp_0$+$tdp_2$)/2
If $tdp_2$ is to be discarded, $tdp_2$=($tdp1$+$tdp_3$)/2
If $tdp_3$ is to be discarded, $tdp_3$=2$tdp_2$−$tdp_1$ According to one embodiment the EstimatedSlope and EstimatedOffset are used to adjust the inverted channel estimate. The tdp for the $i^{th}$ data subcarrier can be determined using the following equation: $tdp_i$=(EstimatedSlope) i+EstimatedOffset, where i is between −26 and +26. For each data carrier a vector with an angle equal to −$tdp_i$ is provided to multiply unit 730. Unit 730 multiplies each of the data carriers in the inverted channel estimate, produced by multiply unit 720, by its corresponding vector with angle equal to −$tdp_i$. The output of unit 730 is an inverted channel estimate which has been adjusted for magnitude, frequency offset, timing drift, and phase noise.

According to one embodiment, the EstimatedOffset is stored for the previous two data symbols so that the EstimatedOffset can be filtered and the filtered offset can be used to determine the correction needed for each data subcarrier of each data symbol. This means that the first data symbol and the SIGNAL symbol do not have filtering. The EstimatedOffset for the previous two data symbols is indicated by offset(i−1) and offset(i−2). The EstimatedOffset for the current symbol is indicated by offset(i). The filtered offset, according to one embodiment, is given by the equation below.

$$offsetfiltered_i = \frac{\text{offset}(i)}{2} + \frac{\text{offset}(i-1)}{4} + \frac{\text{offset}(i-2)}{4}$$

According to one embodiment, the EstimatedSlope is filtered and the EstimatedSlope for the previous two symbols is stored. The filtered EstimatedSlope is used to determine the correction needed for each data subcarrier of each data symbol. The filter, according to one embodiment, is the same as the offset filter with the exception that timing adjustments between symbols affects how the slopes before the timing adjustments are handled. When a timing adjustment is made, the slope is expected to change by π/64. Delaying by a sample produces +π/64, advancing by a sample produces −π/64. Without timing adjustments, the filter is simply:

$$slopefiltered_i = \frac{\text{slope}(i)}{2} + \frac{\text{slope}(i-1)}{4} + \frac{\text{slope}(i-2)}{4}$$

With a timing adjustment between symbol 'i−1' and 'i', slope(i−1) and slope(i−2) should be adjusted by +/−π/64. With weights of ¼ and ¼ for slope(i−1) and slope(i−2), the net effect is +/−π/28. With a timing adjustment between symbol 'i−2' and 'i−1', slope(i−2) should be adjusted by +/−π/64. With a weight of ¼ for slope(i−2), the net effect is +/−π/256.

Timing adjustments based on 'i−3' pilots will take effect between symbols 'i−2' and 'i−1'. Timing adjustments based on 'I−2' pilots will take effect between symbols 'I−1' and 'I'. The hardware must remember the previous three timing adjustments. The slope is expected to increase or decrease as a function of the frequency offset between transmitter and receiver. The frequency offset implies a timing offset drift, which ultimately is responsible for the change in slope. Since we estimate this frequency offset, we could use this estimate to remove the bias caused by the one-sided filters. However, even at 40 parts per million in frequency error between the receiver and transmitter, the error incurred for the most extreme frequency subcarrier (+/−26), is only 0.35 degrees, and so may be ignored according to one embodiment.

Once the EstimatedOffset and the EstimatedSlope have been filtered and offsetfiltered and slopefiltered computed, the estimated tdp for any data carrier is simply calculated by $tdp_i=(slopefiltered)i+offsetfiltered$, where i is between −26 and +26. For each data carrier a vector with an angle equal to $-tdp_i$ is provided to multiply unit 730. Unit 730 multiplies each of the data carriers in the inverted channel estimate, produced by multiply unit 720, by its corresponding vector with angle equal to $-tdp_1$. The output of unit 730 is an inverted channel estimated which has been adjusted for magnitude, frequency offset, timing drift, and phase noise.

As indicated above, timing adjustments may be necessary when the sampling is off by a clock. The timing uncertainty can be inferred by unit 710 from the slope of the pilots. The pilots will have a slope because it is desirable to sample the data symbols several samples early. According to one embodiment, a timing_backoff register specifies the number of samples to back off from the end of each symbol. Consequently, the pilots will have an expected slope which, for a flat channel, is simply $-(\pi)timing\_backoff/64$. However, the transmitter may have a faster or slower clock than the receiver.

With a positive frequency offset, the transmitter has a faster clock, and the receiver will keep slipping later, making the slope flatter. Whenever the slope becomes flat enough, as indicated by the condition below, the timing_adjustment is set to −1 by unit 710. The value $\pi/128$ is referred to herein as a timing threshold.

$$slope+(\pi)timing\_backoff/64 >= \pi/128$$

With a negative frequency offset, the transmitter has a slower clock. The receiver will keep advancing earlier, making the slope steeper. Whenever the slope becomes steep enough, as indicated by the condition below, the timing adjustment is set to +1 by unit 710.

$$slope+(\pi)timing\_backoff/64 <= -\pi/128$$

According to one embodiment the residual frequency offset between the receiver and the transmitter, after the fine offset estimate has been calculated, is estimated by pilot tracking unit 710 using the offsetfiltered for two or more symbols. The residual frequency offset is calculated according to one embodiment using the following equation $$\text{Residual frequency offset} = (\text{offsetfiltered}_{y+Numsymbols} - \text{offsetfiltered}_y)/(160*Numsymbols)$$

160*Numsymbols is the number of clocks over which the phase measurement is made: depending on the modulation used, the Numsymbols can be 2, 4, 8, 16 symbols. The present invention is not limited to the aforementioned values for Numsymbols. One of ordinary skill should appreciate that Numsymbols is application dependent. The residual frequency offset is provided to signal generator 522. According to one embodiment, $offsetfiltered_{y+Numsymbols}$ is the filtered offset for a symbol Numsymbols symbols later than $offsetfiltered_y$, the filtered offset for the first data symbol in a frame. According to an alternative embodiment, $offsetfiltered_y$ is the filtered offset for the second long symbol. It should be appreciated that alternative embodiments are possible and encompassed by the present invention. The residual frequency offset equation provided above can be used for any two symbols for which a filtered offset has been determined.

Thus, methods and apparatus for tracking phase and magnitude of pilot signals, more accurately determining the channel estimate, adjusting symbol timing, and determining residual frequency offset have been described. Although the present invention has been described with reference to specific exemplary embodiments, it will be evident to one of ordinary skill in the art that various modifications and changes may be made to these embodiments without departing from the broader spirit and scope of the invention as set forth in the claims. Accordingly, the specification and drawings are to be regarded in an illustrative rather than a restrictive sense.

We claim:

1. A method for maintaining an accurate channel estimate, the method comprising:

providing a reference channel estimate based on at least one first symbol;

generating a frequency domain representation of a second symbol including a plurality of pilots;

tracking phase change in the plurality of pilots of the second symbol relative to pilots of the at least one first symbol to produce correction factors; and adjusting the reference channel estimate based upon the correction factors, wherein tracking phase change includes determining a least squares fit based on the associated total amount of rotation for each pilot in the second symbol, wherein generating the frequency domain representation of the second symbol includes sampling the second symbol early by a certain number of samples, further comprising:

determining an expected slope based on the certain number of samples by which the second symbol is sampled early; and determining based on the slope and the expected slope a timing adjustment.

2. A method for maintaining an accurate channel estimate, the method comprising:

providing a reference channel estimate based on at least one first symbol;

generating a frequency domain representation of a second symbol including a plurality of pilots;

tracking phase change in the plurality of pilots of the second symbol relative to pilots of the at least one first symbol to produce correction factors;

adjusting the reference channel estimate based upon the correction factors;

producing, for each pilot in the second symbol whose magnitude is above a threshold, an associated total amount of rotation relative to a corresponding pilot in the at least one first symbol;

producing for one of the pilots in the second symbol total amount of rotation based on the associated total amount of rotation of other pilots in the second symbol;

determining a least squares fit based on the associated total amount of rotation for each pilot in the second symbol whose magnitude is above the threshold and the total amount of rotation based on the associated total amount of rotation of other pilots in the second symbol; and generating, based on the least squares fit, the plurality of second correction factors.

3. The method of claim 2 wherein producing for one of the pilots includes producing for one of the pilots in the second symbol whose magnitude is below the threshold a total amount of rotation based on the associated total amount of rotation of other pilots in the second symbol.

4. A method for maintaining an accurate channel estimate, the method comprising:
providing a reference channel estimate based on at least one training symbol;
generating a frequency domain representation of a first data symbol including a plurality of pilots;
tracking phase change in the plurality of pilots of the first data symbol relative to pilots of the at least one training symbol to produce first correction factors; and
adjusting the reference channel estimate based upon the first correction factors,
wherein tracking phase change includes determining for each pilot in the first data symbol an associated total amount of rotation relative to a corresponding pilot in the at least one training symbol,
wherein tracking phase change includes determining a least squares fit based on the associated total amount of rotation for each pilot in the first data symbol, wherein generating the frequency domain representation of the first data symbol includes sampling the first data symbol early by a certain number of samples, further comprising:
determining an expected slope based on the certain number of samples by which the first data symbol is sampled early; and
determining based on the slope and the expected slope a timing adjustment.

5. A method for maintaining an accurate channel estimate, the method comprising:
providing a reference channel estimate based on at least one training symbol;
generating a frequency domain representation of a first data symbol including a plurality of pilots;
tracking phase change in the plurality of pilots of the first data symbol relative to pilots of the at least one training symbol to produce first correction factors;
adjusting the reference channel estimate based upon the first correction factors;
producing, for each pilot in the first data symbol whose magnitude is above a threshold, an associated total amount of rotation relative to a corresponding pilot in the at least one training symbol;
producing for one of the pilots in the first data symbol a total amount of rotation based on the associated total amount of rotation of other pilots in the first data symbol;
determining a least squares fit based on the associated total amount of rotation for each pilot in the first data symbol whose magnitude is above the threshold and the total amount of rotation based on the associated total amount of rotation of other pilots in the first data symbol; and
generating, based on the least squares fit, the plurality of second correction factors.

6. The method of claim 5 wherein producing for one of the pilots includes producing for one of the pilots in the first data symbol whose magnitude is below the threshold a total amount of rotation based on the associated total amount of rotation of other pilots in the first data symbol.

7. A method for maintaining an accurate channel estimate, the method comprising:
generating a frequency domain representation of at least one training symbol;
determining a number of clock cycles that the at least one training symbol is sampled early;
generating first correction factors based on the number of clock cycles;
adjusting the frequency domain representation based upon the first correction factors to produce a reference channel estimate;
generating a frequency domain representation of a first data symbol;
tracking phase change in pilots of the first data symbol relative to pilots of the at least one training symbol to produce second correction factors; and
adjusting the reference channel estimate based upon the second correction factors.

8. The method of claim 7 wherein adjusting results in pilot signals in the frequency domain representation of the at least one training symbol having a substantially flat phase response.

9. The method of claim 7 wherein tracking phase change includes determining for each pilot in the first data symbol an associated total amount of rotation relative to a corresponding pilot in the at least one training symbol.

10. A method for maintaining an accurate channel estimate, the method comprising:
generating a frequency domain representation of at least one training symbol;.
determining a number of clock cycles that the at least one training symbol is sampled early;
generating first correction factors based on the number of clock cycles;
adjusting the frequency domain representation based upon the first correction factors to produce a reference channel estimate;
generating a frequency domain representation of a first data symbol;
tracking phase change in pilots of the first data symbol relative to pilots of the at least one training symbol to produce second correction factors; and
adjusting the reference channel estimate based upon the second correction factors,
wherein tracking phase change includes determining for each pilot in the first data symbol an associated total amount of rotation relative to a corresponding pilot in the at least one training symbol and a least squares fit based on the associated total amount of rotation for each pilot.

11. The method of claim 10 wherein tracking phase change includes generating, based on the least squares fit, the second correction factors.

12. The method of claim 10 wherein tracking phase change includes determining a slope and a phase intercept based upon the least squares fit, and wherein generating, based on the least squares fit, includes generating the second correction factors based upon subcarrier numbers, the phase intercept, and the slope.

13. The method of claim 12 wherein generating the frequency domain representation of the first data symbol includes sampling the first data symbol early by a certain number of samples, further comprising:
determining an expected slope based on the certain number of samples by which the first data symbol is sampled early; and determining based on the slope and the expected slope a timing adjustment.

14. A method for maintaining an accurate channel estimate, the method comprising:
generating a frequency domain representation of at least one training symbol;
determining a number of clock cycles that the at least one training symbol is sampled early;
generating first correction factors based on the number of clock cycles;
adjusting the frequency domain representation based upon the first correction factors to produce a reference channel estimate;
generating a frequency domain representation of a first data symbol;
tracking phase change in pilots of the first data symbol relative to pilots of the at least one training symbol to produce second correction factors; and
adjusting the reference channel estimate based upon the second correction factors,
wherein tracking phase change includes determining for each pilot in the first data symbol an associated total amount of rotation relative to a corresponding pilot in the at least one training symbol and a least squares fit based on the associated total amount of rotation for each pilot,
wherein tracking phase change includes determining a slope and a phase intercept based upon the least squares fit, determining a filtered slope and a filtered phase intercept based on the slope, the phase intercept, and previous slopes and previous phase intercepts associated with data symbols that arrived before the first data symbol, and
wherein generating, based on the least squares fit, includes generating the second correction factors based upon subcarrier numbers, the filtered slope and the filtered phase intercept.

15. The method of claim 14 further comprising:
determining a filtered phase intercept for a reference symbol, wherein the reference symbol is separated from the first data symboi by a certain number of symbols;
determining a residual frequency offset based upon the filtered phase intercept for the reference symbol, the filtered phase intercept for the first data symbol, and the certain number of symbols.

16. The method of claim 15, wherein the reference symbol is a data symbol that is not separated from the at least one training symbol by any other data symbol.

17. The method of claim 15, wherein the reference symbol is the one of the at least one training symbol.

18. A method for maintaining an accurate channel estimate, the method comprising:
generating a frequency domain representation of at least one training symbol;
determining a number of clock cycles that the at least one training symbol is sampled early;
generating first correction factors based on the number of clock cycles;
adjusting the frequency domain representation based upon the first correction factors to produce a reference channel estimate;
generating a frequency domain representation of a first data symbol;
tracking phase change in pilots of the first data symbol relative to pilots of the at least one training symbol to produce second correction factors;
adjusting the reference channel estimate based upon the second correction factors;
producing, for each pilot in the first data symbol whose magnitude is above a threshold, an associated total amount of rotation relative to a corresponding pilot in the at least one training symbol;
producing for one of the pilots in the first data symbol a total amount of rotation based on the associated total amount of rotation of other pilots in the first data symbol;
determining a least squares fit based on the associated total amount of rotation for each pilot in the first data symbol whose magnitude is above the threshold and the total amount of rotation based on the associated total amount of rotation of other pilots in the first data symbol; and
generating, based on the least squares fit, the plurality of second correction factors.

19. A method for maintaining an accurate channel estimate, the method comprising:
generating a frequency domain representation of at least one training symbol;
determining number of clock cycles that the at least one training symbol is sampled early;
generating a plurality of first correction factors based on the number of clock cycles;
wherein adjusting results in pilot signals in the frequency domain representation of the at least one training symbol having a substantially flat phase response adjusting the frequency domain representation based upon the plurality of first correction factors to produce a reference channel estimate;
generating a frequency domain representation of a first data symbol;
tracking phase change in pilots of the first data symbol relative to the at least one training symbol to produce second correction factors;
wherein tracking phase change includes determining for each pilot in the first data symbol an associated total amount of rotation relative toa corresponding pilot in the at least one training symbol, determining a least squares fit based on the associated total amount of rotation for each pilot, and generating, based on the least squares fit, the second correction factors; and
adjusting the reference channel estimate based upon the second correction factors.

20. A method for maintaining an accurate channel estimate, the method comprising:
generating a frequency domain representation of at least one training symbol; determining number of clock cycles that the at least one training symbol is sampled early; generating a plurality of first correction factors based on the number of clock cycles;
wherein adjusting results in pilot signals in the frequency domain representation of the at least one training symbol having a substantially flat phase response and using the frequency domain representation based upon the first correction factors to produce a reference channel estimate;
generating a frequency domain representation of a first data symbol;
tracking phase change in pilots of the first data symbol relative to pilots in the at least one training symbol to produce second correction factors;
wherein tracking phase change includes determining for each pilot in the first data symbol an associated total amount of rotation relative to a corresponding pilot in the at least one training symbol, determining a least squares fit based on the associated total amount of rotation for each pilot, generating, based on the least squares fit, the second correction factors, determining a slope and phase intercept based upon the least squares fit, and wherein generating, based on the least squares fit, includes generating the second correction factors based upon subcarrier numbers, the phase intercept, and the slope; and adjusting the reference channel estimate based upon the second correction factors.

21. An apparatus for maintaining an accurate channel estimate, the apparatus comprising:

a frequency domain transform unit that is to generate a frequency domain representation of at least one training symbol and a frequency domain representation of a first data symbol;

an early sampling detection circuit that is to determine, based on the frequency domain representation of the at least one training symbol, number of clock cycles that the at least one training symbol is sampled early;

an angle-to-vector converter that is to produce a plurality of first correction factors based on the number of clock cycles;

a first multiplier that is to adjust the frequency domain representation based upon the first correction factors to produce a reference channel estimate;

a pilot phase tracking circuit that is to track total phase rotation in pilots of the first data symbol relative to pilots in the at least one training symbol to produce a plurality of second correction factors; and a second multiplier that is to adjust the reference channel estimate based upon the plurality of second correction factors.

22. The apparatus of claim 21 wherein the pilot phase tracking circuit is to determine for each pilot in the first data symbol an associated total amount of rotation relative to a corresponding pilot in the at least one training symbol.

23. The apparatus of claim 21 wherein pilot signals in the reference channel estimate have a substantially flat phase response.

24. The apparatus of claim 23, wherein the pilot phase tracking circuit is to determine a least squares fit based on the associated total amount of rotation for each pilot.

25. The apparatus of claim 24 wherein the pilot phase tracking circuit generates, based on the least squares fit, the plurality of second correction factors.

26. The apparatus of claim 25, wherein the pilot phase tracking circuit determines a slope and a phase intercept based upon the least squares fit, and generates the plurality of second correction factors based upon subcarrier numbers, the phase intercept, and the slope.

27. The apparatus of claim 26, wherein the frequency domain representation of the first data symbol is based on sampling the first data symbol early by a certain number of samples, and wherein the pilot phase tracking circuit determines an expected slope based on the certain number of samples by which the first data symbol is sampled early, and determines based on the slope and the expected slope a timing adjustment.

28. The apparatus of claim 24 wherein the pilot phase tracking circuit determines a slope and a phase intercept based upon the least squares fit, determines a filtered slope and a filtered phase intercept based on the slope, the phase intercept, and previous slopes and previous phase intercepts associated with data symbols that arrived before the first data symbol, and generates the plurality of second correction factors based upon subcarrier numbers, the filtered slope and the filtered phase intercept.

29. The apparatus of claim 28 the pilot phase tracking circuit determines a filtered phase intercept for a reference symbol, wherein the reference symbol is separated from the first data symbol by a certain number of symbols and determines a residual frequency offset based upon the filtered phase intercept of the reference symbol, the filtered phase intercept of the first data symbol, and the certain number of symbols.

30. The apparatus of claim 29 wherein the reference symbol is a data symbol that is not separated from the at least one training symbol by any other data symbol.

31. The apparatus of claim 29 wherein the reference symbol is the one of the at least one training symbol.

32. The apparatus of claim 24, wherein the pilot phase tracking circuit is to produce, for each pilot in the first data symbol whose magnitude is above a threshold, an associated total amount of rotation relative to a corresponding pilot in the at least one training symbol, produce for one of the pilots in the first data symbol a total amount of rotation based on the associated total amount of rotation of other pilots in the first data symbol, determine a least squares fit based on the associated total amount of rotation for each pilot in the first data symbol whose magnitude is above the threshold and the total amount of rotation based on the associated total amount of rotation of other pilots in the first data symbol, and generate, based on the least squares fit, the plurality of second correction factors.

33. An apparatus for maintaining an accurate channel estimate, the apparatus comprising:

a frequency domain transform unit that is to generate a frequency domain representation of at least one training symbol and a frequency domain representation of a first data symbol;

an early sampling detection circuit that is to determine, based on the frequency domain representation of the at least one training symbol, number of clock cycles that the at least one training symbol is sampled early;

an angle-to-vector converter that is to produce a plurality of first correction factors based on the number of clock cycles;

a first multiplier that is to adjust the frequency domain representation based upon the first correction factors to produce a reference channel estimate;

a pilot phase tracking circuit that is to determine for each pilot in the first data symbol an associated total amount of rotation relative to a corresponding pilot in the at least one training symbol, is to determine a least squares fit based on the associated total amount of rotation for each pilot, and is to produce a plurality of second correction factors; and a second multiplier that is to adjust the reference channel estimate based upon the plurality of second correction factors.

34. An apparatus for maintaining an accurate reference channel estimate, the apparatus comprising:

a memory that stores the reference channel estimate;

a pilot phase tracking circuit that is receive pilots of at least one training symbol and pilots of a first data symbol and is to determine for a plurality of the pilots in the first data symbol an associated total amount of rotation relative to a corresponding pilot in the at least one training symbol, is to determine a least squares fit based on the associated total amount of rotation for each pilot of the plurality of the pilots in the first data symbol, and is to produce a plurality of first correction factors based on the least squares fit; and a multiplier that is to adjust the reference channel estimate based upon the plurality of first correction factors, wherein the first data symbol has a first data symbol frequency representation that is based on sampling the first data symbol early by a certain number of samples, and wherein the pilot phase tracking circuit determines an expected slope based on the certain number of samples by which the first data symbol is sampled early, and determines based on the slope and the expected slope a timing adjustment.

35. An apparatus for maintaining an accurate reference channel estimate, the apparatus comprising:

a memory that stores the reference channel estimate;

a pilot phase tracking circuit that is receive pilots of at least one training symbol and pilots of a first data symbol and is to determine for a plurality of the pilots in the first data symbol an associated total amount of rotation relative to a corresponding pilot in the at least one training symbol, is to determine a least squares fit based on the associated total amount of rotation for each pilot of the plurality of the pilots in the first data symbol, and is to produce a plurality of first correction factors based on the least squares fit; and a multiplier that is to adjust the reference channel estimate based.upon the plurality of first correction factors, wherein the pilot phase tracking circuit is to produce, for. a plurality of pilots in the first data symbol whose magnitude is above a threshold, an associated total amount of rotation relative to a corresponding pilot in the at least one symbol, produce for one of the pilots in the first data symbol a total amount of rotation based on the associated total amount of rotation of other pilots in the first data symbol, determine a least squares fit based on the associated total amount of rotation for each pilot in the first data symbol whose magnitude is above the threshold and the total amount of rotation based on the associated total amount of rotation of other pilots in the first data symbol, and generate, based on the least squares fit, the plurality of second correction factors.

36. A method for maintaining an accurate channel estimate, the method comprising:

providing a reference channel estimate based upon at least one training symbol;

calculating a reference power based upon pilots of the at least one training symbol;

calculating a data symbol power based upon pilots of a data symbol;

determining a scaling factor based upon the reference power and the data symbol power; and scaling the reference channel estimate based upon the scaling factor.

37. The method of claim 36, further comprising:

filtering the data symbol power to produce a filtered data symbol power; and determining the scaling factor based upon the filtered data symbol power.

38. An apparatus for maintaining an accurate channel estimate, the apparatus comprising:

memory for storing a reference channel estimate based upon at least one training symbol;

a magnitude tracking circuit that is to calculate a reference power based upon pilots of the at least one training symbol and a data symbol power based upon pilots of a data symbol, and is to calculate a scaling factor based upon the reference power and the data symbol power; and a multiply unit that is to scale the reference channel estimate based upon the scaling factor.

39. The apparatus of claim 38, wherein the magnitude tracking circuit is to filter th data symbol power to produce a filtered data symbol power and is to calculate the scaling factor based upon the filtered data symbol power.

* * * * *